US012566922B2

(12) United States Patent
Jia

(10) Patent No.: US 12,566,922 B2
(45) Date of Patent: Mar. 3, 2026

(54) KNOWLEDGE ACCELERATOR PLATFORM WITH SEMANTIC LABELING ACROSS DIFFERENT ASSETS

(71) Applicant: SAP SE, Walldorf (DE)

(72) Inventor: Liling Jia, Shanghai (CN)

(73) Assignee: SAP SE, Walldorf (DE)

( * ) Notice: Subject to any disclaimer, the term of this patent is extended or adjusted under 35 U.S.C. 154(b) by 355 days.

(21) Appl. No.: 18/116,102

(22) Filed: Mar. 1, 2023

(65) Prior Publication Data

US 2024/0296287 A1     Sep. 5, 2024

(51) Int. Cl.
| | |
|---|---|
| *G06F 40/30* | (2020.01) |
| *G06F 3/0481* | (2022.01) |
| *G06F 40/242* | (2020.01) |
| *G06F 40/289* | (2020.01) |
| *G06N 5/022* | (2023.01) |

(52) U.S. Cl.
CPC ............ *G06F 40/30* (2020.01); *G06F 3/0481* (2013.01); *G06F 40/242* (2020.01); *G06F 40/289* (2020.01); *G06N 5/022* (2013.01)

(58) Field of Classification Search
CPC ...... G06F 40/30; G06F 3/0481; G06F 40/242; G06F 40/289; G06N 5/022
See application file for complete search history.

(56) References Cited

U.S. PATENT DOCUMENTS

| | | | |
|---|---|---|---|
| 2009/0028446 A1* | 1/2009 | Wu ...................... | G06F 16/5846 |
| | | | 382/229 |
| 2011/0137921 A1* | 6/2011 | Inagaki ............... | G06F 16/3347 |
| | | | 707/E17.061 |
| 2012/0233127 A1* | 9/2012 | Solmer ............... | G06F 16/3347 |
| | | | 707/769 |

* cited by examiner

*Primary Examiner* — Richemond Dorvil
*Assistant Examiner* — Ethan Daniel Kim
(74) *Attorney, Agent, or Firm* — Klarquist Sparkman, LLP

(57) ABSTRACT

A knowledge accelerator platform automatically builds and maintains a knowledge index of assets stored across a plurality of sources to allow consolidated searching of assets in the plurality of sources. The platform automatically processes the assets to extract metadata information and record labels for each asset in the index, without storing the content of an asset itself in the index, where a semantic dictionary maps labels to terminology in different domains. The knowledge accelerator platform further provides an internal user interface that allows internal users to evaluate the knowledge contained in the assets at a high level and thus identify knowledge gaps that can be mitigated, and promote quality assets within targeted user communities. The knowledge accelerator platform also provides an external user interface that recommends assets to users based on various factors such as their experience, status, and domain interests.

20 Claims, 20 Drawing Sheets

402

400

Web Browser

UI Exchange

410

Expertise Community Portal      412

HTML Widget

UI Exchange

420

Runtime Service      430

Application Service      432

Application Service

Request/Response      440

Data Service      442

Data Service

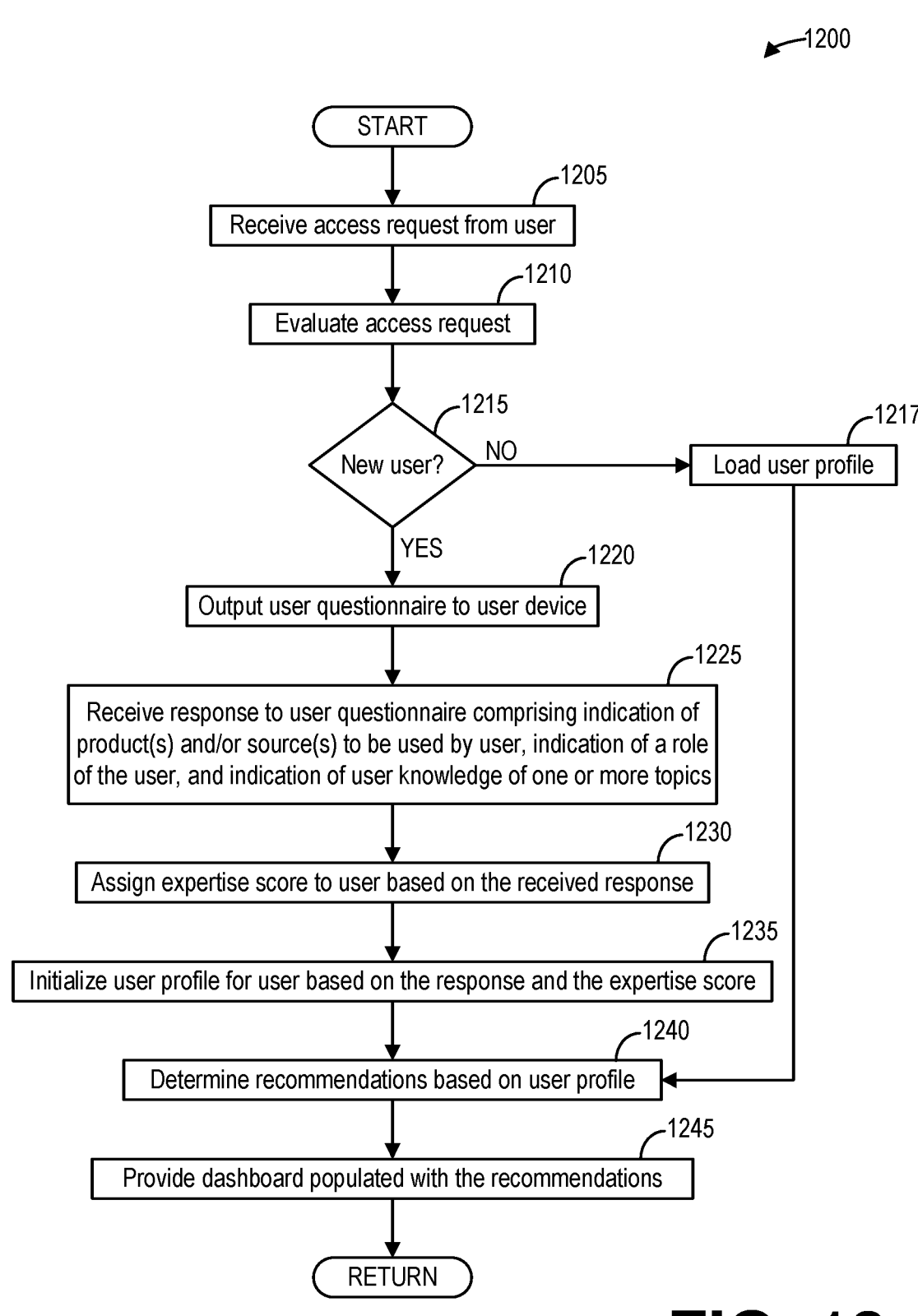

←1200

START

1205
Receive access request from user

1210
Evaluate access request

1215
New user?
NO →
1217
Load user profile

YES

1220
Output user questionnaire to user device

1225
Receive response to user questionnaire comprising indication of product(s) and/or source(s) to be used by user, indication of a role of the user, and indication of user knowledge of one or more topics 1230
Assign expertise score to user based on the received response 1235
Initialize user profile for user based on the response and the expertise score 1240
Determine recommendations based on user profile 1245
Provide dashboard populated with the recommendations

RETURN

```
__xPath__ = {
    "COMMUNITY": {
    "extractColumnRule": [
            {                                    ←—1305
                    "ruleName":"id",
                    "datatype":"text",
                    "txnField":"GENERICATTRIBUTE40"
            },
            {

"ruleName":"url",
                    "datatype":"text",
                    "txnField":"GENERICATTRIBUTE1"
            },
            {

"ruleName":"title",
                    "datatype":"text",
                    "txnField":"GENERICATTRIBUTE2"
            },
            {
                    "ruleName":"type",
                            ●
                            ●
                            ●

```
__siteContent__ = {
       "COMMUNITY":{                                    1410
              "extract blog content":{
                     "rulename":"extract blog content",
                     "rule":"//div[@class="ds-blog-post-detail"]",
                     "table":"ws_sitecontent",
                     "tablefield":"sitecontent",
                     "updateflag":"none"
                     }
              },                                        1420
       "KBA":{
              "extract blog content":{
                     "rulename":"extract blog content",
                     "rule":"//div[@id="content"]",
                     "table":"ws_sitecontent",
                     "updateflag":"none"
                     }
              },                                        1430
       "LEARNING HUB":{
              "extract blog content":{
                     "rulename":"extract learning hub content",
                     "rule":"//div[@id="mainContentWrapper"]",
                     "table":"",
                     "tablefield":"",
                     "updateflag":"none"
                     }
              }
}
```

FIG. 14

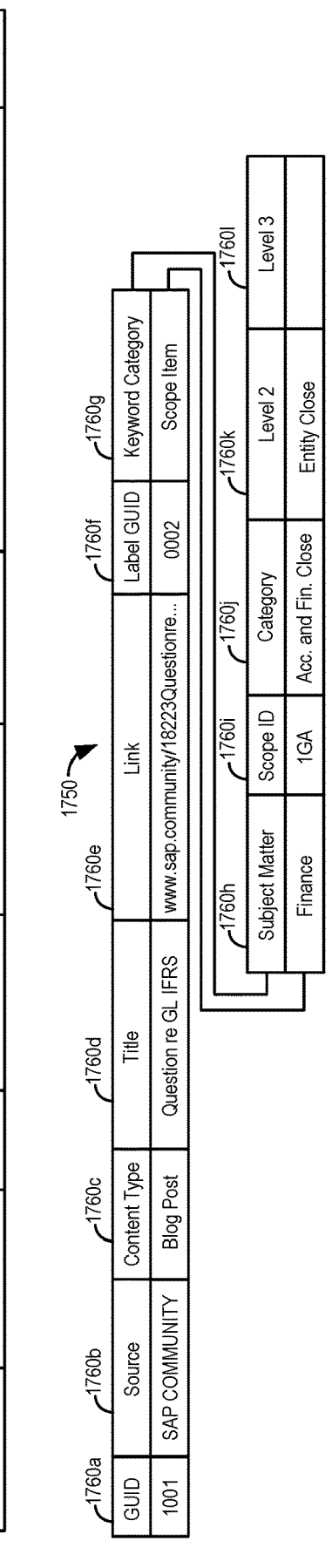

1700

| Keyword Category (1710a) | Subject Matter (1710b) | Scope ID (1710c) | Category (1710d) | Level 2 (1710e) | Level 3 (1710f) | Keyword (1710g) | GUID (1710h) |
|---|---|---|---|---|---|---|---|
| Scope Item | Finance | 1GA | Acc. and Fin. Close | Entity Close | | "Accounting and Financial Close – Group Ledger IFRS" | 0001 |
| Scope Item | Finance | 1GA | Acc. and Fin. Close | Financial Accounting | | "Accounting and Financial Close – Group Ledger IFRS" | 0002 |
| Scope Item | Service Delivery | 19W | Delivery Status | Del. Issue Analysis | | "Service Delivery Issue Analysis" | 0003 |
| LOB Assignment | Finance | | Accounts Payable | Invoice to Pay | Outgoing Payment | "payment media" | 0004 |
| LOB Assignment | Finance | | Accounts Payable | Invoice to Pay | Supplier Invoice | "supplier line item" | 0005 |
| Cross Topic | | | Extensibility | Developer Extensibility | | "Stability Contracts" | 0006 |
| Localization | | | China | Financial Operations | Invoice Management | "VAT Invoice Management" + "China" | 0007 |
| Business Object | | | Credit Memo | | | "Credit Memo" | 0008 |

1750

| GUID (1760a) | Source (1760b) | Content Type (1760c) | Title (1760d) | Link (1760e) | Label GUID (1760f) | Keyword Category (1760g) |
|---|---|---|---|---|---|---|
| 1001 | SAP COMMUNITY | Blog Post | Question re GL IFRS | www.sap.community/18223Questionre... | 0002 | Scope Item |

| Subject Matter (1760h) | Scope ID (1760i) | Category (1760j) | Level 2 (1760k) | Level 3 (1760l) |
|---|---|---|---|---|
| Finance | 1GA | Acc. and Fin. Close | Entity Close | |

FIG. 17

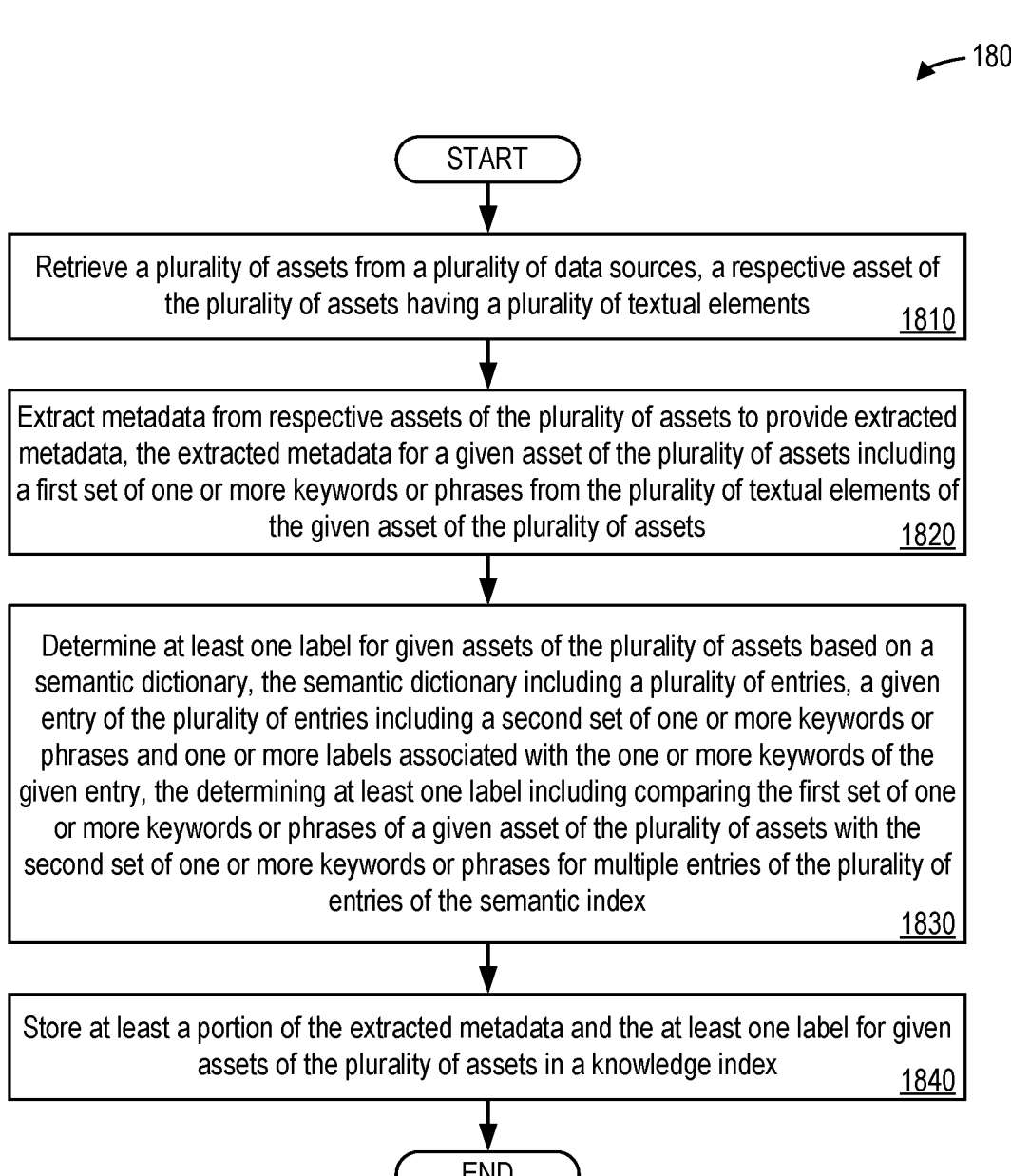

1800

START

Retrieve a plurality of assets from a plurality of data sources, a respective asset of the plurality of assets having a plurality of textual elements        1810

Extract metadata from respective assets of the plurality of assets to provide extracted metadata, the extracted metadata for a given asset of the plurality of assets including a first set of one or more keywords or phrases from the plurality of textual elements of the given asset of the plurality of assets        1820

Determine at least one label for given assets of the plurality of assets based on a semantic dictionary, the semantic dictionary including a plurality of entries, a given entry of the plurality of entries including a second set of one or more keywords or phrases and one or more labels associated with the one or more keywords of the given entry, the determining at least one label including comparing the first set of one or more keywords or phrases of a given asset of the plurality of assets with the second set of one or more keywords or phrases for multiple entries of the plurality of entries of the semantic index        1830

Store at least a portion of the extracted metadata and the at least one label for given assets of the plurality of assets in a knowledge index        1840

END

FIG. 18

SOFTWARE 1980 IMPLEMENTING TECHNOLOGIES

KNOWLEDGE ACCELERATOR PLATFORM WITH SEMANTIC LABELING ACROSS DIFFERENT ASSETS

FIELD

The present disclosure generally relates to interfacing with knowledge assets across a plurality of sources.

BACKGROUND

Large organizations may use various platforms to enable information exchange between users for different purposes. For example, one platform may be used for internal discussion of technical problems, another platform may be used to provide tutorials on specific topics, and yet another platform may support user-created blogs. There may be a proliferation of such platforms within a single organization, where the content may be both internally and externally facing and may range across completely different fields, such as from financial accounting or product sales to technical implementation.

While a senior member of the organization may be familiar with the different platforms and aware of the types content to be found therein, a junior member may be significantly less familiar with the platforms. Such a junior member may nevertheless be tasked with collecting information about a given topic. When undertaking such a task, the junior member may expend a substantial amount of manual effort to collect knowledge that is dispersed across platforms, which requires a substantial amount of time in addition to effort, with the risk that the junior member may overlook key documents due to their relative inexperience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, the present disclosure provides technologies for implementing and using a knowledge accelerator platform. A plurality of assets are retrieved from a plurality of data sources. A respective asset of the plurality of assets includes a plurality of textual elements. Metadata is extracted from respective assets of the plurality of assets to provide extracted metadata. The extracted metadata for a given asset of the plurality of assets includes a first set of one or more keywords or phrases from the plurality of textual elements of the given asset of the plurality of assets.

At least one label for given assets of the plurality of assets is determined based on a semantic dictionary. The semantic dictionary includes a plurality of entries. A given entry of the plurality of entries includes a second set of one or more keywords or phrases and one or more labels associated with the one or more keywords of the given entry. The determining at least one label includes comparing the first set of one or more keywords or phrases of a given asset of the plurality of assets with the second set of one or more keywords or phrases for multiple entries of the plurality of entries of the semantic index. At least a portion of the extracted metadata and the at least one label for given assets of the plurality of assets are stored in a knowledge index.

The present disclosure also includes computing systems and tangible, non-transitory computer-readable storage media configured to carry out, or including instructions for carrying out, an above-described method. As described herein, a variety of other features and advantages can be incorporated into the technologies as desired.

The foregoing and other objects, features, and advantages of the invention will become more apparent from the following detailed description, which proceeds with reference to the accompanying figures.

BRIEF DESCRIPTION OF THE DRAWINGS

FIG. 12 is a high-level flow chart illustrating an example method for providing personalized recommendations with a knowledge acceleration platform, according to an embodiment.

FIG. 13 illustrates example code syntax declaring rules for parsing assets of a given source, according to an embodiment.

FIG. 14 illustrates example code syntax declaring rules for extracting content from assets from a plurality of sources, according to an embodiment.

FIG. 17 is a diagram illustrating example implementations of a semantic dictionary and a knowledge index.

FIG. 18 is a high-level flow chart illustrating an example method for a knowledge accelerator platform, according to an embodiment.

DETAILED DESCRIPTION

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Overview

Expert knowledge may be found in documents and other assets scattered across an organization. Junior members of such an organization often need to review such documents to prepare themselves to work on a project. Such tasks become time-consuming for especially large organizations that may host hundreds or thousands of websites with specific purposes and target audiences. Further, terminology for similar concepts varies across different domains, and so a user searching for relevant information may not find important documents. As a result, efforts may be duplicated.

A knowledge accelerator platform automatically builds and maintains a knowledge index of assets stored across a plurality of sources to allow consolidated searching of assets in the plurality of sources. The platform automatically processes the assets to extract metadata information and record labels for each asset in the index, without storing the content of an asset itself in the index, where a semantic dictionary maps labels to terminology in different domains. The platform further automatically assigns quality scores and recommendation scores to assets based on the metadata, usage of the assets, views of the assets, and expert labeling. The knowledge accelerator platform further provides an internal user interface that allows internal users to evaluate the knowledge contained in the assets at a high level and thus identify knowledge gaps that can be mitigated, and promote quality assets within targeted user communities. The knowledge accelerator platform also provides an external user interface that recommends assets to users based on various factors such as their experience, status, and domain interests.

Example 2—System Architecture

Figure 1:
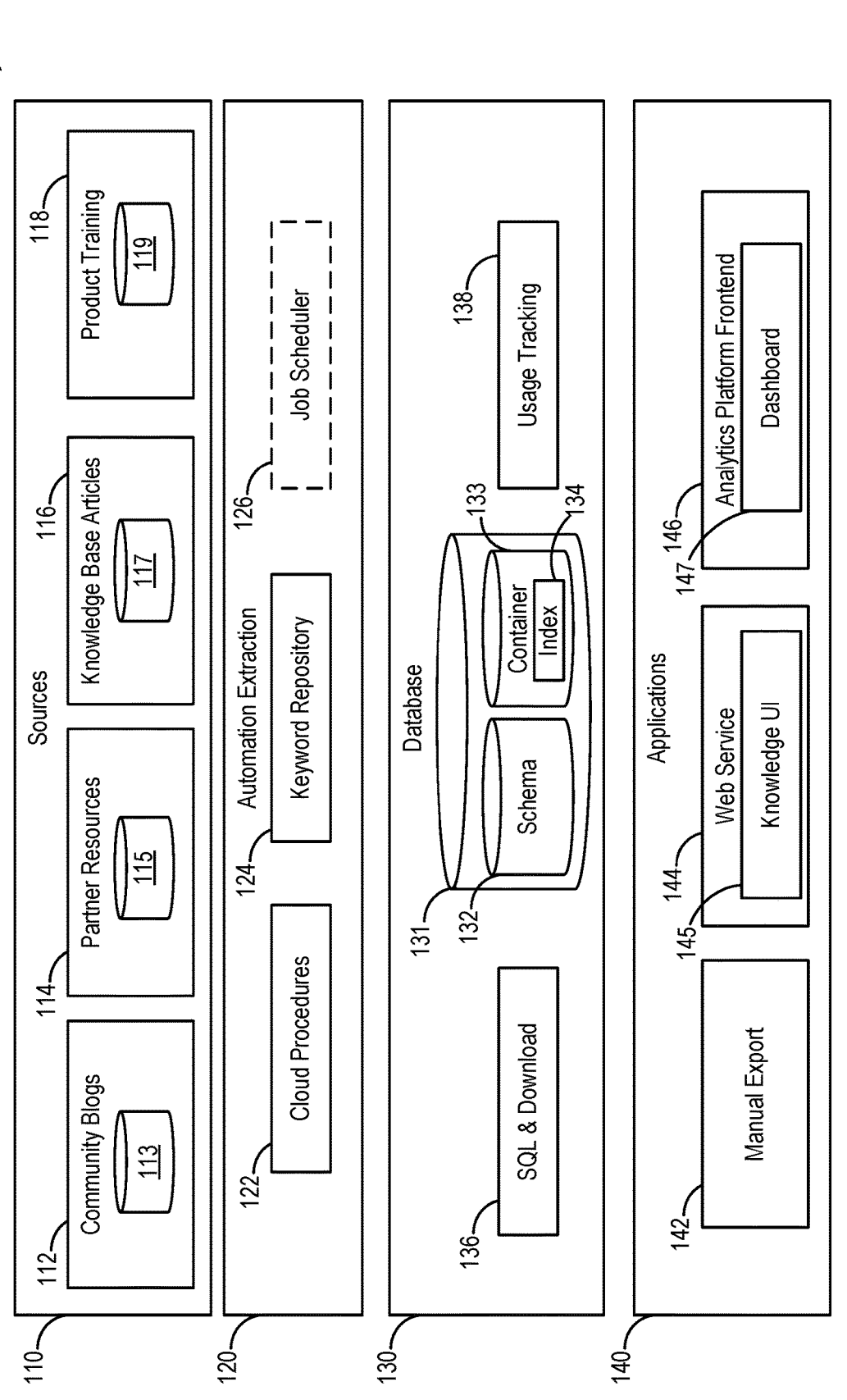
FIG. 1 is a block diagram illustrating an example system for a knowledge accelerator platform, according to an embodiment.

FIG. 1 shows a block diagram of an example system 100 for a knowledge acceleration platform. The system 100 includes a plurality of knowledge sources 110, which may include but are not limited to sources such as community blogs 112, partner resources 114, knowledge base articles 116, and product training 118. Other example knowledge sources 110 may comprise data sources such as video data sources, as an illustrative example. The sources 110 may each comprise repositories 113, 115, 117, and 119 respectively storing assets containing information for each respective source 110. Assets may comprise any document or data object comprising information, which may include but are not limited to blog posts, knowledge articles, community board posts, video technical documentation, and so on. Each source of the sources 110 may be configured differently, for example, such that there is not a consistent application programming interface (API) for each source 110.

System 100 further comprises an automation extraction layer 120, a database layer 130, and application layer 140. The automation extraction layer 120 automatically extracts knowledge from the sources 110 according to cloud procedures 122 and a keyword repository 124. The cloud procedures 122 control how the automation extraction layer 120 interacts with each source 110 to extract information. For example, the cloud procedures 122 may include procedures to perform open API JSON extraction of information from the community blogs 112, procedures to extract information from partner resources 114 via a browser-based web-application testing framework, procedures to download reports and/or articles from knowledge base articles 116 in a given format (e.g., XLS or CSV formats), and separate procedures to extract assets from product training 118. Thus, the cloud procedures 122 may include procedures to interact with the sources 110 that include web scraping, API calls, file imports, and the like. The keyword repository 124 comprises a semantic dictionary that links semantically related keywords that may be found in assets of the sources 110. A job scheduler 126 schedules jobs comprising extraction of assets from the sources 110 and analysis of such assets as provided herein.

The database layer 130 comprises a database 131 which further comprises a schema 132 and a container 133 storing a knowledge index 134. The schema 132 enables logical groupings of objects such as tables, views, and stored procedures. The container 133 comprises a design-time container and a corresponding run-time container. The knowledge index 134 stored therein comprises a knowledge index storing metadata and analysis of assets of the sources 110, as provided further herein. The database layer 130 can interact with applications layer 140.

The database layer 130 further comprises SQL and download module 136 to perform manual export 142 and usage tracking module 138 configured to monitor usage of assets via a webservice 144 providing a knowledge user interface (UI) 145. Usage of assets may be stored in the knowledge index 134 to provide analytics regarding assets of the sources 110. Further, the analytics platform frontend 146 includes a dashboard 147 that enables read and write access to the knowledge index 134, such that certain users may provide expert recommendations and leverage the knowledge contained in the knowledge index 134.

Figure 2:
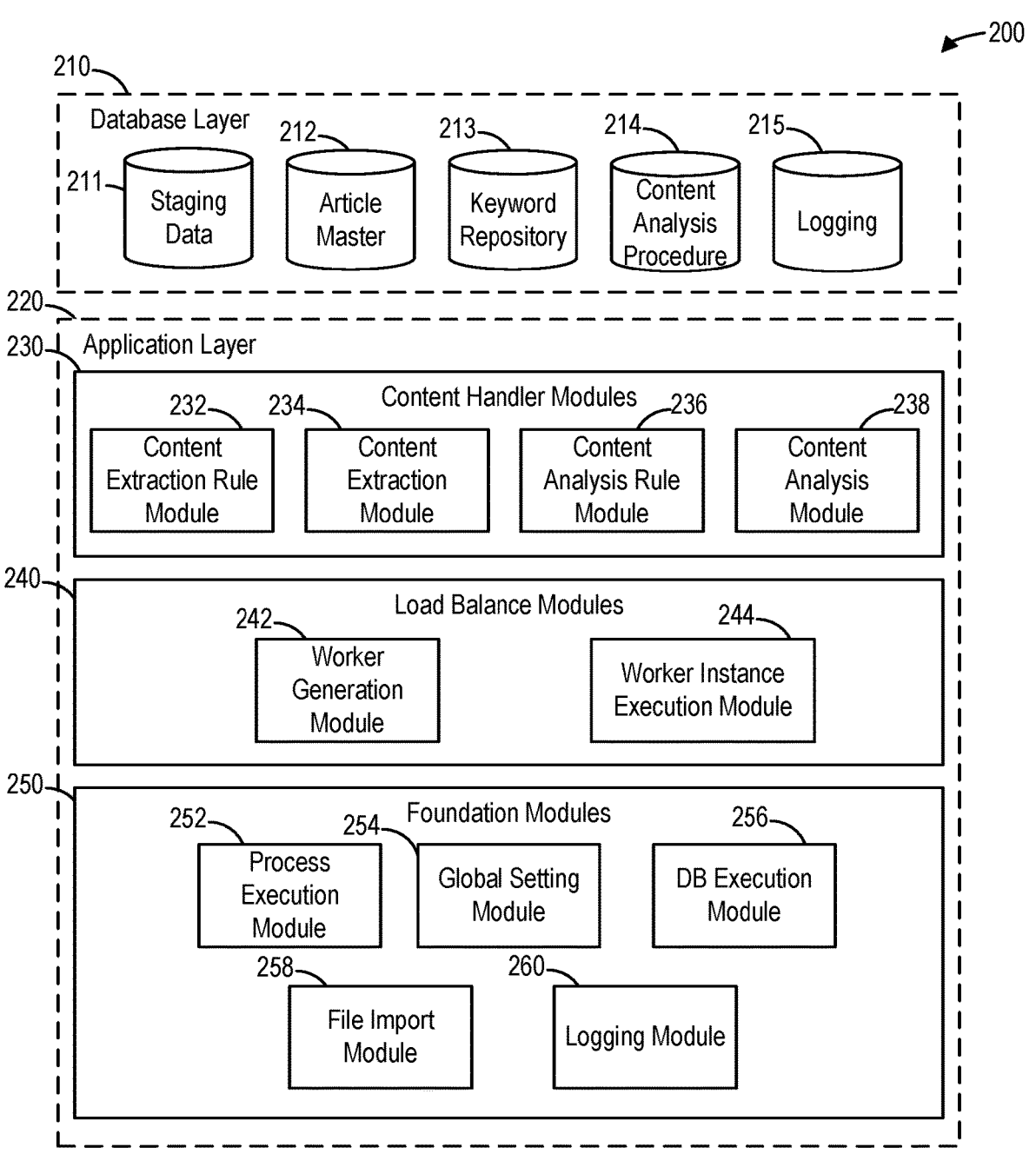
FIG. 2 is a block diagram illustrating an example module architecture for a knowledge accelerator platform, according to an embodiment.

As another example, FIG. 2 shows a block diagram illustrating an architecture for a system 200 for asset extraction according to some examples. The system 200 includes a database layer 210 comprising a plurality of data stores including a data store 211 storing staging data, a data store 212 storing article masters, a data store 213 storing a keyword repository, a data store 214 storing content analysis procedures, and a data store 215 storing logging data. The data store 211 for staging data stores raw data from content handler or file import. The data store 212 for article masters contains production data after the extraction. The data store 213 for keyword repository contains the keyword list maintained by an internal expert. The data store 214 for the content analysis module stores procedures to verify extracted content and update the labels to article master tables. The data store 215 for the logging module comprises a table storing system logs and user activities.

An application layer 220 comprises content handler modules 230, load balance modules 240, and foundation modules 250. The content handler modules 230 comprise a content extraction rule module 232, a content extraction module 234, a content analysis rule module 236, and a content analysis module 238. The content execution rule module 232 comprises JSON data extraction rule of searching results consumed by the content extraction module 232, such as an XPath (e.g., parsing expression) of parsing the response body, and mapping between the response element and staging table. The content extraction module 234 comprises web scraping modules configured to collect data from a portal search engine. The content analysis rule module 236 comprises JSON data extraction rule of article content consumed by the content analysis module 238, such as XPath of parsing the response body, and mapping between the response element and the staging table. The content analysis module 238 comprises web scraping modules to fetch key information from article content such as key performance indicator numbers.

The load balance modules 240 comprise a worker generation module 242 and a worker instance execution module 244. The worker generation module 242 calculates the workload and generates the worker instance to improve the process performance. The worker instance execution module 244 calls the content handler with proper parameters, and creates a log against worker instance identifier.

The foundation modules 250 comprise a process execution module 252, a global setting module 254, a database execution module 256, a file import module 258, and a logging module 260. The process execution module 252 triggers the extraction process and initializes batch information. The global setting module 254 maintains global parameters of the process, such as database connection information, inbound/outbound folders, log file naming conventions, reusable functions, load-balance worker creation parameters, and API endpoint URLs. The database execution module 256 executes SQL statements, for example. The file import module 258 comprises a reusable module configured to handle any file import, for example by verifying file content with a target table, and loading file data into a database. Logging module 260 provides the system log functionality and generates log files.

Figure 3:
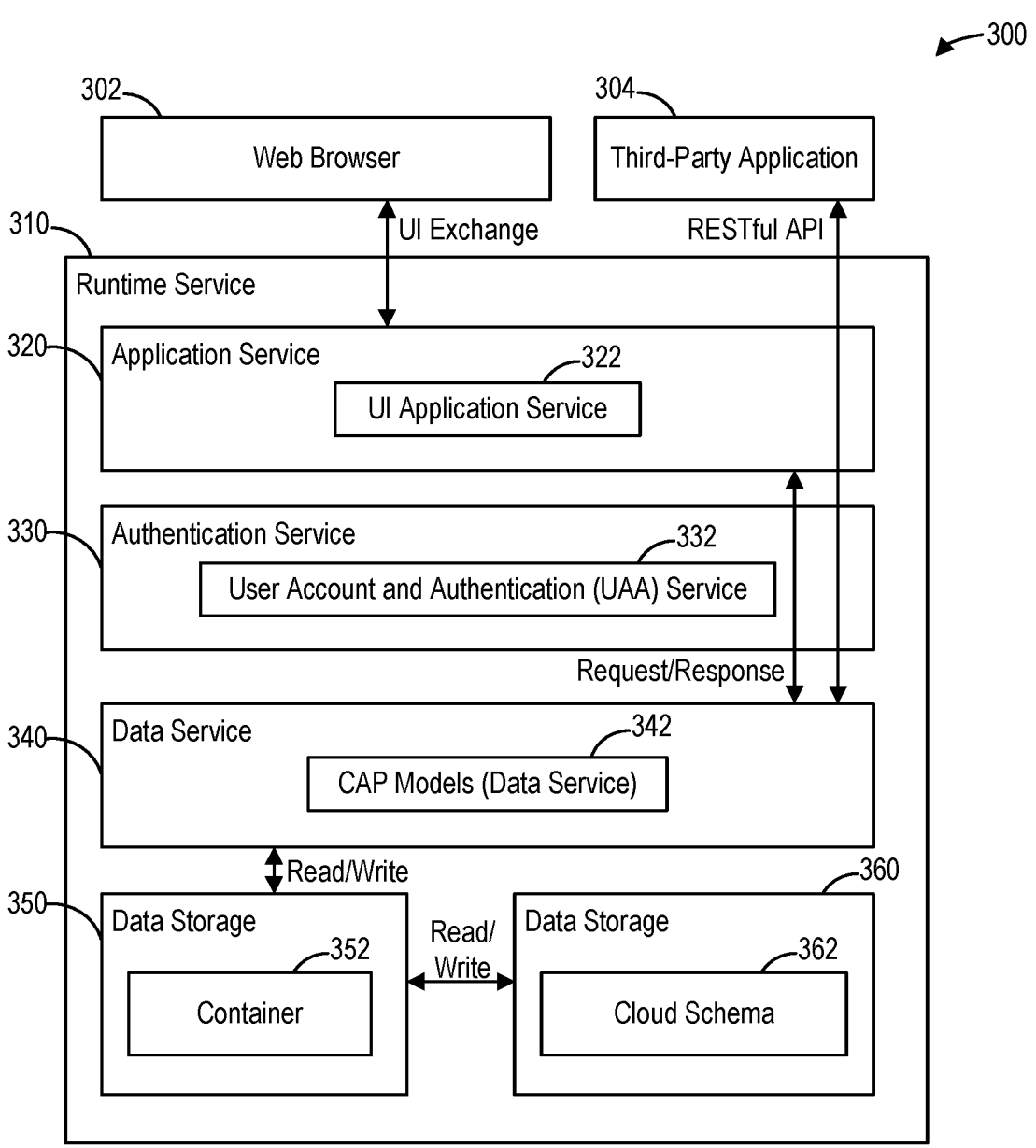
FIG. 3 is a block diagram illustrating an example architecture for providing a user interface for accessing and editing a knowledge accelerator platform, according to an embodiment.

FIG. 3 shows a block diagram illustrating an example architecture for a system 300 for a user interface dashboard that may be displayed via a web browser 302 or a third-party application 304 according to some examples. The system 300 comprises a runtime service 310 comprising an application service 320 with a UI application service 322 providing article curation functionalities, an authentication service 330 comprising user account and authentication (UAA) service 332 for securing product data, and a data service 340 comprising cloud application programming (CAP) models 342 for data services thereby allowing user access to article assets data via UI exchange to the web browser 302 providing the user interface dashboard or RESTful API calls to a third-party application 304. Data storage 350 comprises a deployment infrastructure container 352 comprising a runtime database instance providing read/write data access to the data service, and data storage 360 comprises a cloud schema 362 comprising a core database containing all product data.

The user interface dashboard provided via the web browser 302 provides various functionalities. For example, on a home screen master page of the user interface dashboard, a user is able to search articles from a home screen table with filters, such as data source, title, item scope, cross topic, and so on. The user can mark favorite articles and change the content status. On a home screen detail page for a given asset, the user can review the additional attributes from detail page, modify the article labels in detail screen, add comments to each article in detail screen, update the content status from Open to (Recommended/Irrelevant), understand the change history from Change Log section in detail screen, and see the labelling evidence from detail page. On an administration screen of the user interface dashboard, the user can retrieve keywords based on keyword types, create new keywords, edit existing keywords, and delete keywords from the list.

Figure 8:
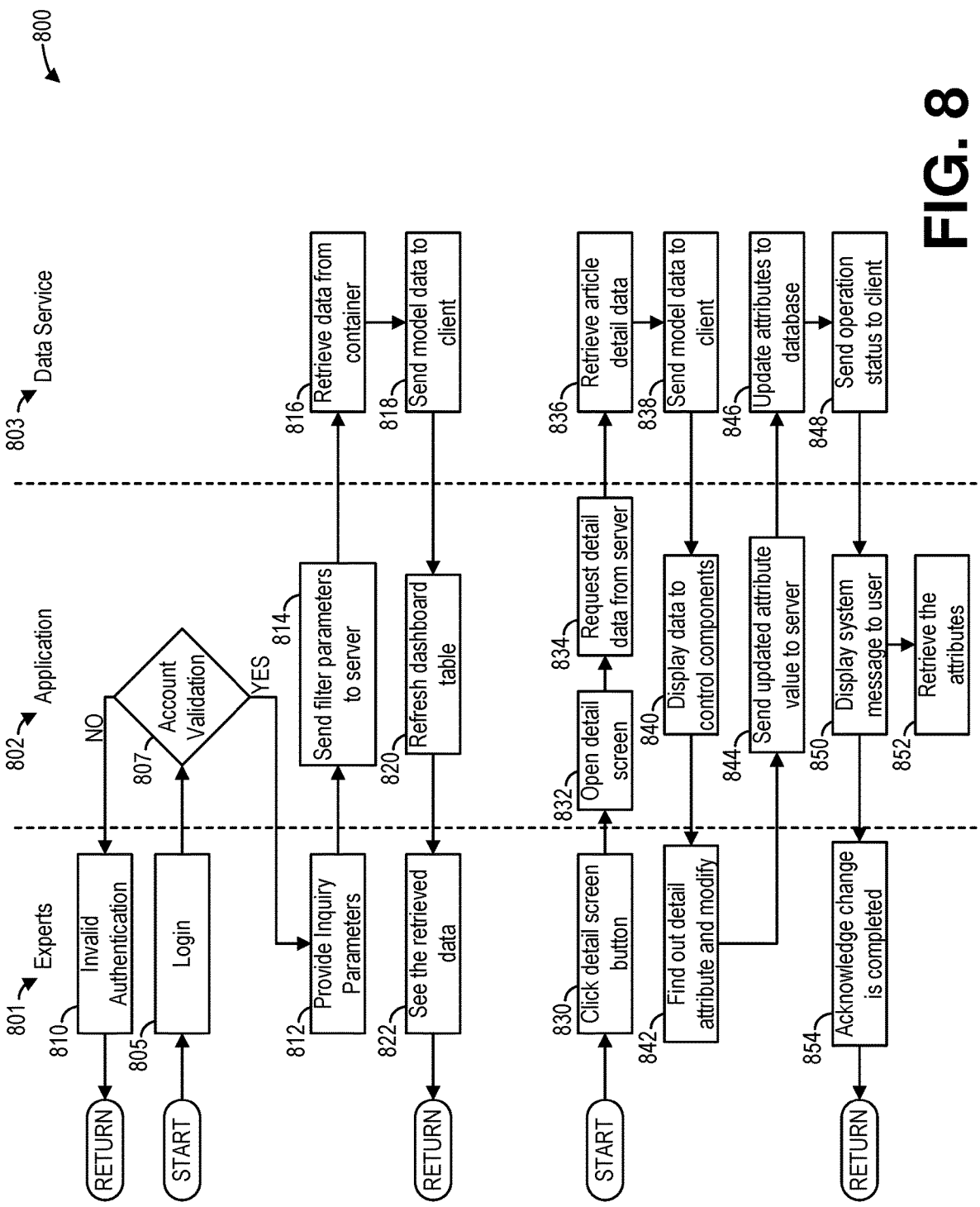
FIG. 8 is a high-level swim-lane flow chart illustrating example methods for interfacing with a knowledge accelerator platform, according to an embodiment.
Figure 9:
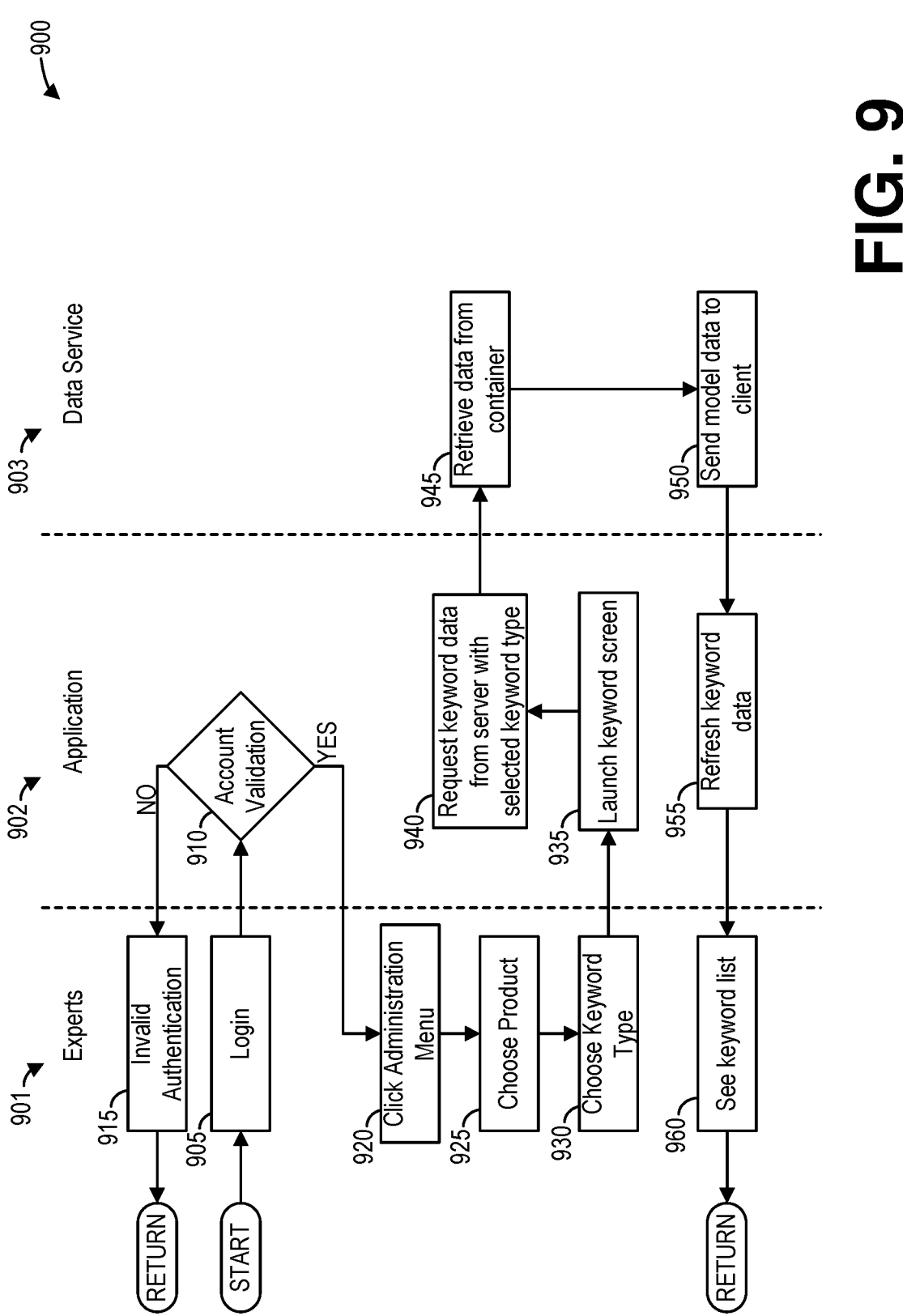
FIG. 9 is a high-level swim-lane flow chart illustrating an example method for accessing a semantic model for a knowledge accelerator platform, according to an embodiment.
Figure 10:
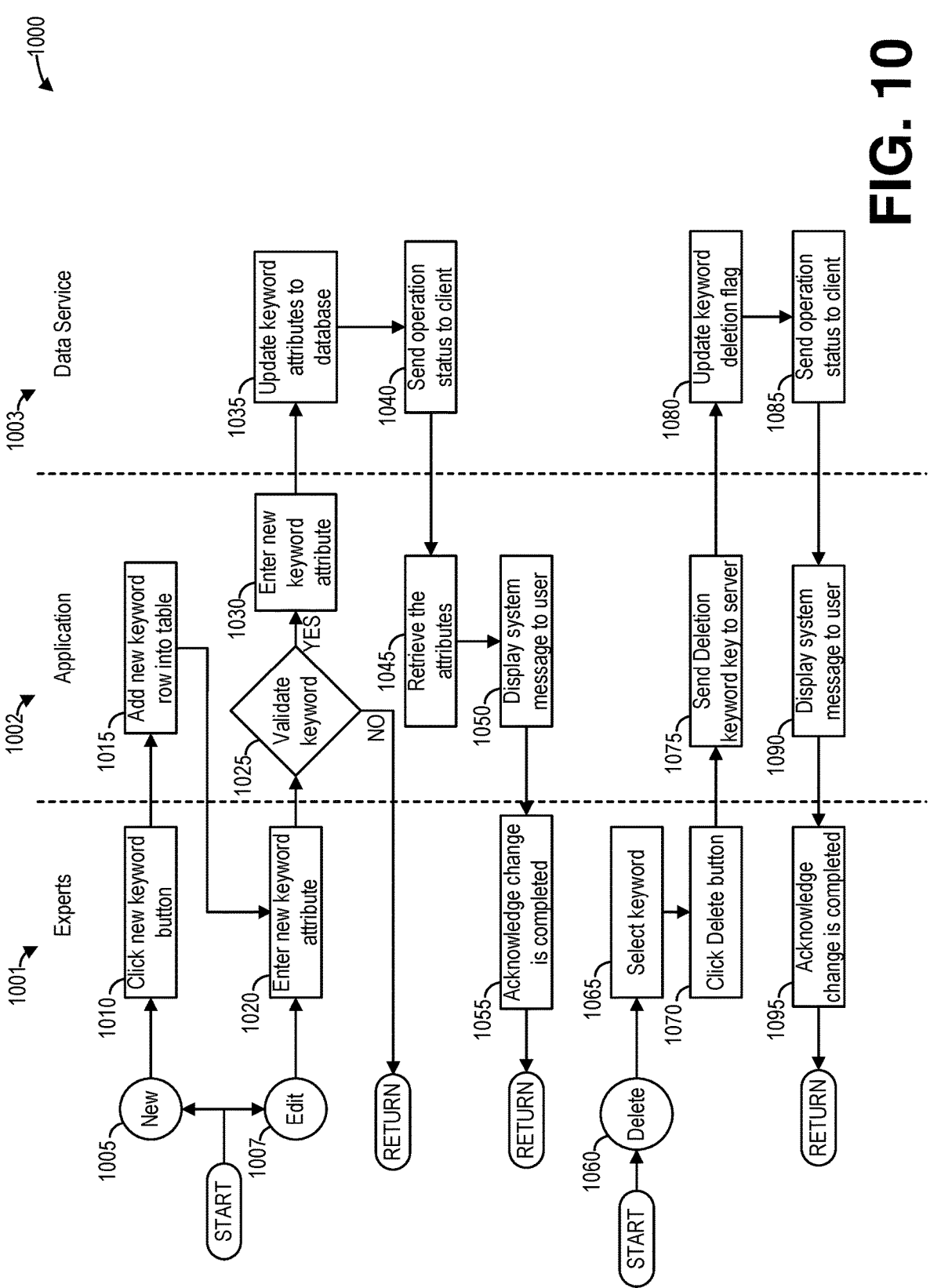
FIG. 10 is a high-level swim-lane flow chart illustrating example methods for modifying a semantic model for a knowledge accelerator platform, according to an embodiment.

Example methods for the system 300 are described further herein with regard to FIGS. 8-10, though it should be appreciated that other methods may be implemented with the system 300 without departing from the scope of the present disclosure.

Figure 4:
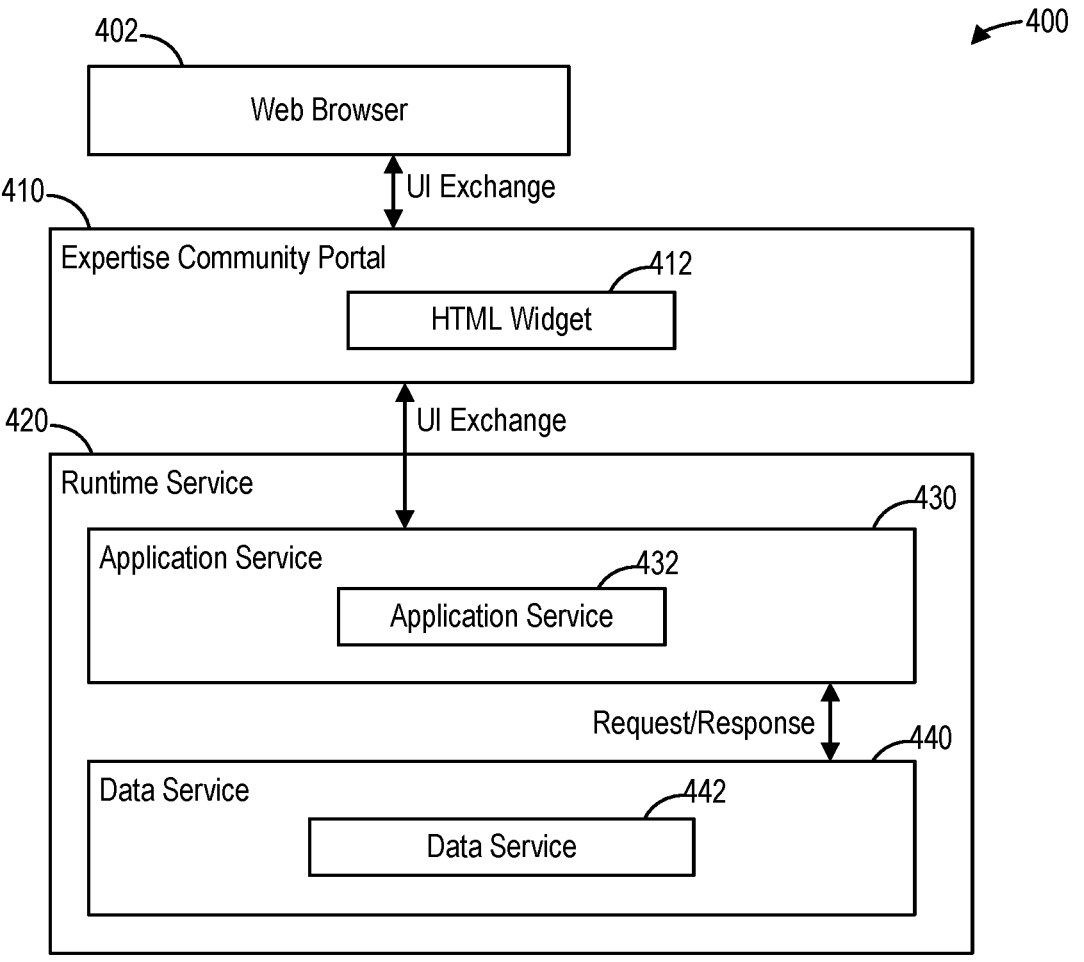
FIG. 4 is a block diagram illustrating an example architecture for providing a user interface for accessing a knowledge accelerator platform, according to an embodiment.

FIG. 4 shows a block diagram illustrating an example architecture for a system 400 for an expertise community application. The application may be displayed to users via a user interface in a web browser 402 to display recommended articles for different lines of business. A runtime service comprises an application service and a data service. The expertise community portal 410 comprises a web-based widget 412. The application service 430 and the data service 440 of the runtime service 420 retrieve data from the index, for example, as well as selected assets themselves to display recommended articles to a partner. A method for the system 400 is described further herein with regard to FIG. 11, though it should be appreciated that other methods may be implemented with the system 400 without departing from the scope of the present disclosure.

Example 3—Example Methods

Figure 5:
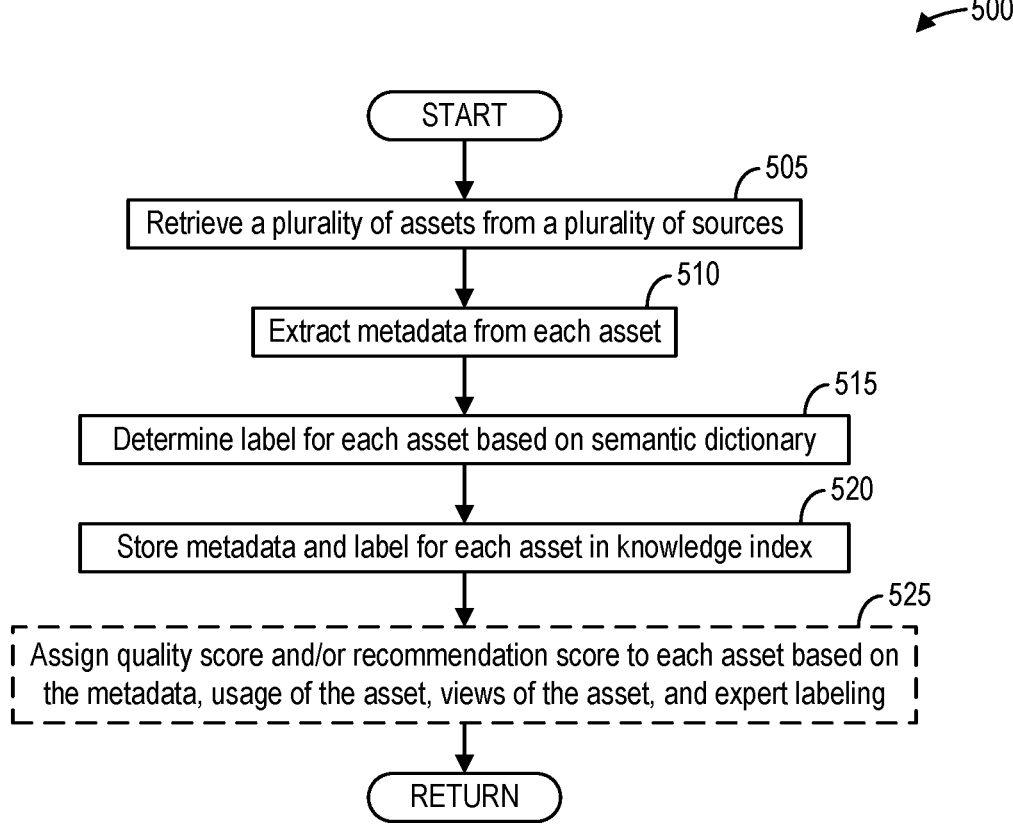
FIG. 5 is a high-level flow chart illustrating an example method for consolidating knowledge in a knowledge index, according to an embodiment.

FIG. 5 shows a high-level flow chart illustrating an example method 500 for a knowledge acceleration platform, according to an embodiment. In particular, method 500 relates to extracting information from a plurality of assets stored in a plurality of different data sources and consolidating information regarding the assets into a knowledge index. Method 500 may be implemented via a system such as the system 100 depicted in FIG. 1, as an illustrative and non-limiting example.

At 505, method 500 retrieves a plurality of assets from a plurality of sources. For example, each asset may comprise a different article or another document comprising information provided via text, images, video, audio, combinations thereof, and the like. Each source of the plurality of sources may be configured for a different purpose or community. The assets may be stored in each source differently, for example, and different sources may provide different interfaces for accessing the data. As such, method 500 may retrieve assets from different sources according to different procedures.

At 510, method 500 extracts metadata from each asset. Each asset may be configured differently, for example, so method 500 may use a different procedure to extract metadata from each asset according to the configuration of the asset. Metadata may include, but is not limited to, the title of the asset, the location of the asset (e.g., a URL or another file location identifier), author(s) of the asset, a scope of the asset content, a line of business (LOB) for the asset, a source of the asset, a type of asset (e.g., blog post, event, and so on), an industry of the asset, a creation date or timestamp of the asset, an updated date or timestamp indicating a time and date when the asset was last updated, and so on. Such metadata may be expressly provided by the asset, for example, where a title of the asset may be associated with a "title" tag, though it should be appreciated that procedures may be provided to automatically determine metadata for a given asset according to the asset's structure.

At 515, method 500 determines a label for each asset based on a semantic dictionary, such as a keyword repository. For example, method 500 may determine a label for a given asset based on the semantic dictionary and the metadata and/or content of the asset. The semantic dictionary may comprise a table of keywords, for example, along with keys connected keywords that are semantically related. In this way, two different assets that are semantically related but use different terminology (e.g., due to different localizations or industries) may be assigned a same label such that the two assets are linked and associated due to the semantic connection. As a result, a user searching for keywords that are expressly contained in one of the assets but not the other may be provided with both assets as search results because of the associated semantic label.

At 520, method 500 stores metadata and labels for each asset in a knowledge index. The knowledge index comprises a database table, as an illustrative and non-limiting example, that comprises a row for each asset. The knowledge index stores metadata and labels for each asset without storing the content of the asset itself, which enables analytics of the assets and a unified dashboard for exploring assets across data sources.

At 525, method 500 assigns a quality score and/or recommendation score to each asset based on the metadata, usage of the asset, views of the asset, and expert labeling. For example, a higher quality score may be assigned to a first asset compared to a second asset with similar metadata because the first asset has relatively higher usage and/or views compared to the second asset. Such quality scores or recommendation scores may be automatically assigned, for example, by processing the assets with a machine learning model configured to assign scores. Such quality scores and/or recommendation scores may further be determined by processing the content of an asset itself, rather than based only on metadata relating to the asset. Further, manual scores may be assigned by experts who review the asset, or experts may manually verify the automatically generated scores. Method 500 then returns.

Figure 6:
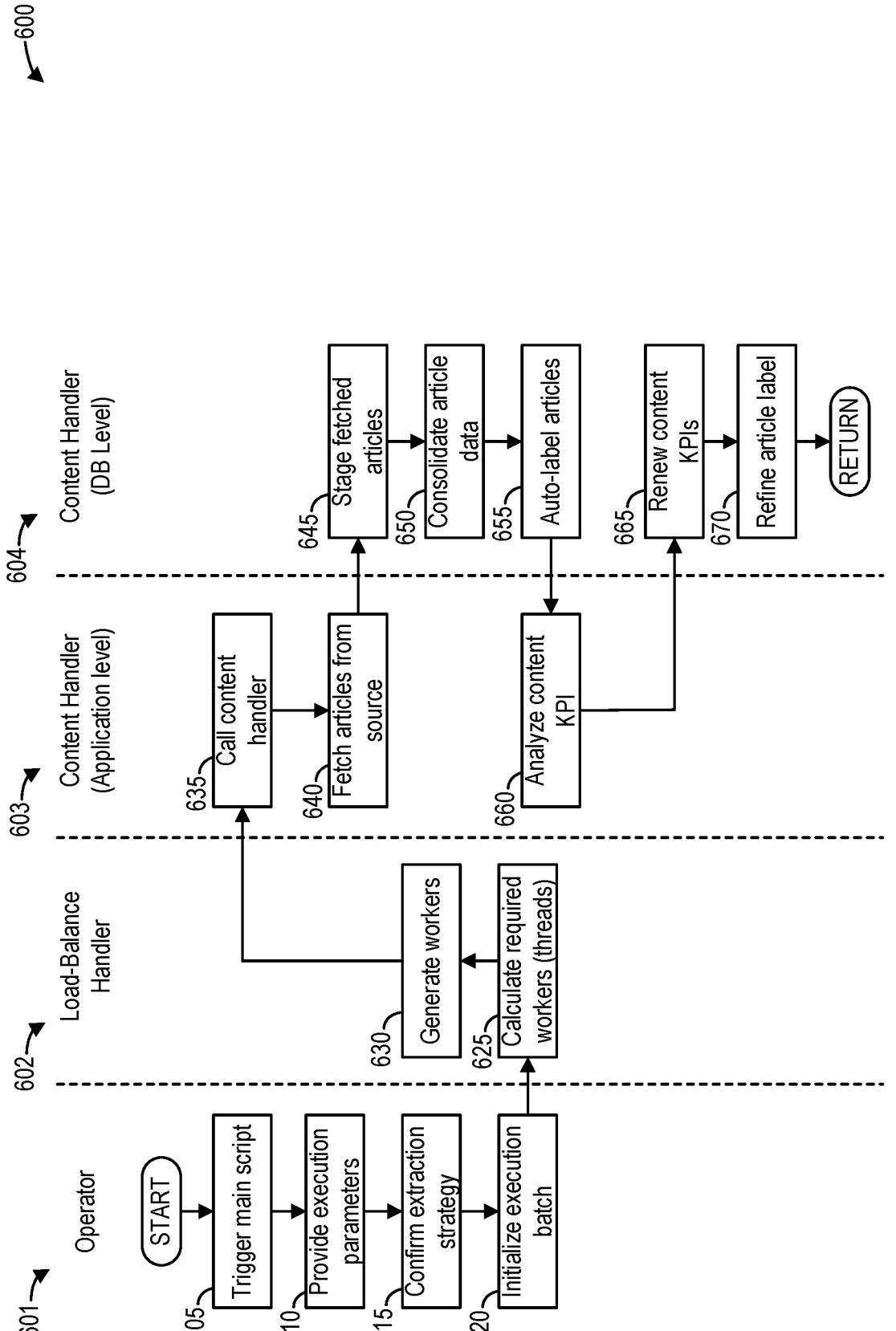
FIG. 6 is a high-level swim-lane flow chart illustrating an example method for asset extraction, according to an embodiment.

FIG. 6 shows a high-level swim-lane flow chart illustrating an example method 600. The method 600 may be implemented with the system 200 depicted in FIG. 2, as an illustrative and non-limiting example, where the load-balance handler 602 corresponds to the load balance modules 240, and the content handlers 603 and 604 correspond to the content handler modules 230. An operator 601 triggers the process at 605 by executing the main script. The main script is data source specific, where a different data source has its own main script. The operator 601 then provides the execution parameters at 610 before the process is started. Execution parameters include, but are not limited to, running environment, and extraction strategy (e.g., full or incremental). At 615, the execution strategy is confirmed, where the operator 601 provides the period parameter to restrict the scope of extraction. For example, the operator 601 may provide a period range if an incremental load is confirmed. The execution batch is then initialized at 620, and the main script generates a batch identifier for subsequent usage.

The load-balance handler 602 calculates operational workers (threads) at 625 by calculating the number of operational workers against the structure of the data source.

The structure of the data source may be different, for example, for a community blog source, the structure may be based on "keyword category." The load-balance handler 602 then generates worker instances at 630 based on the data structure.

The content handler 603 at the application level is called at 635 which then fetches data from the data source at 640 by web scraping. Each of the worker instances calls the content handler 603 with its own parameters in parallel. The content handler 603 triggers web scraping logic at 640, sending URL requests to source web portal search engine, and fetches JSON data from the response. The content handler 603 uses different ways to interface with the web portal search engine or different sources.

The content handler 604 at the database level then stages data to the database at 645, storing fetched data into a staging table of the database. The granularity of the staging data is "URL" and "keyword." In other words, one asset or article may appear zero or more than one time with different keywords. The database content handler 604 triggers a store procedure to merge the new articles into the core article table, thus consolidating article data at 650. In the core article table, the URL is the unique key of the article. The database content handler 604 performs auto-labeling of articles at 655, for example by triggering a labeling store procedure to tag the matched articles. The new keywords are appended to the system table, and the keywords are serialized for improving UI performance.

At 660, content key performance indicators (KPI) are analyzed. For example, the content handler 603 fetches KPI numbers from article content (e.g., view count). The database content handler 604 updates the latest KPI value to the system table, thus renewing content KPIs at 665. The database content handler 604 triggers the purging of incorrect matched base on advanced labeling features to refine article labels at 670. Method 600 then returns.

Figure 7:
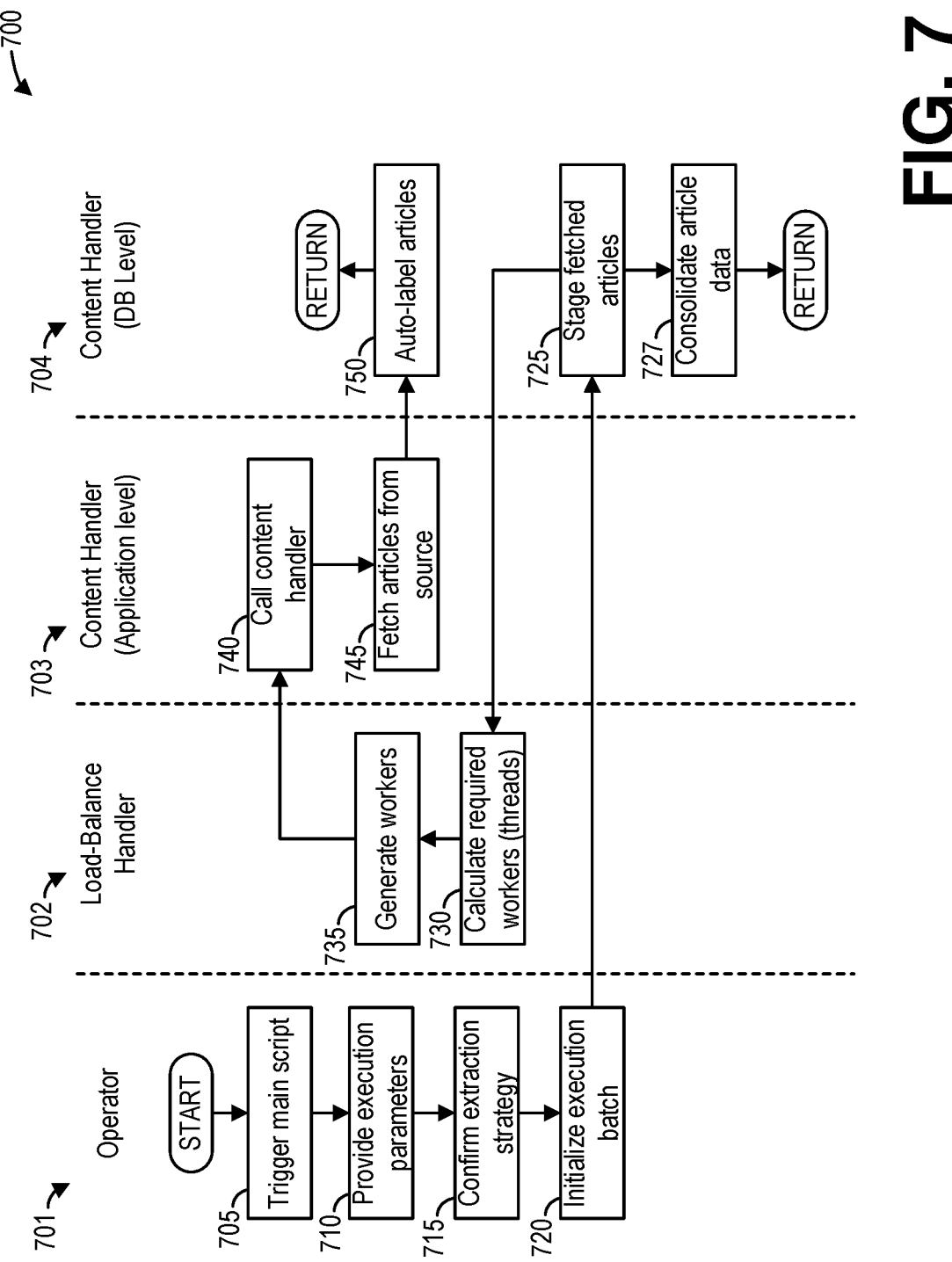
FIG. 7 is a high-level swim-lane flow chart illustrating another example method for asset extraction, according to an embodiment.

FIG. 7 shows a high-level swim-lane flow chart illustrating an example method 700 for flat file data source extraction. The method 700 may be implemented with the system 200 depicted in FIG. 2, as an illustrative and non-limiting example, where the load-balance handler 702 corresponds to the load balance modules 240, and the content handlers 703 and 704 correspond to the content handler modules 230. An operator 701 triggers the process by executing a main script at 705. The main script is data source specific, where each data source has its own main script. The operator 701 provides execution parameters at 710 before the process is started, where execution parameters include running environment and extraction strategy (full or incremental). At 715, the execution strategy is confirmed, where the operator 701 provides the period parameter to restrict the scope of extraction. For example, the operator 701 may provide a period range if an incremental load is confirmed. The execution batch is then initialized at 720, and the main script generates a batch identifier for subsequent usage.

At 725, the content handler 704 at the database level stages fetched articles by uploading file data into a staging table. The database content handler 704 triggers a store procedure to merge the new articles, thus consolidating the article data at 727, into a core article table where the URL of an article is the unique key for that article.

At 730, the load-balance handler 702 calculates the number of operational workers against the structure of the data source. For example, it may be based on the total number of import data. The load-balance handler 702 generates worker instances at 735 based on the data structure. Each of the worker instances calls the content handler 703 at 740 with its own parameters in parallel. The content handler 703 handles web scraping logic to fetch articles from a source at 745. The database content handler 704 triggers a labeling store procedure to automatically label and tag the articles at 750. Method 700 then returns.

FIG. 8 shows a swim-lane flowchart illustrating an example method 800 for article inquiry and attribute modification. Method 800 may be implemented with the system 300 depicted in FIG. 3, as an illustrative and non-limiting example, where an expert user 801 interfaces with the knowledge acceleration platform via a web browser 302 or third-party application 304, the application 802 comprises the application service 320, and the data service 803 comprises the data service 340. An expert user 801 launches the dashboard with certain URL, for example, and provides login information at 805 to login to the application 802. The application 802 verifies the user authentication at 807, for example, by returning an invalid authentication error at 810 if the user authentication or login information is invalid ("NO"), or alternatively grants access if the user authentication is valid ("YES"). The user 801 provides inquiry parameters at 812 from a filter section, and clicks a go button to submit. The application 802 sends the selected inquiry or filter parameters to a backend data service 803 to retrieve data at 816. At 818, the backend data service 803 returns data to the UI client of the application 802 which refreshes the dashboard table at 820 to display the data to the expert user 801, who sees the retrieved data at 822.

For article attribute changes, the user 801 chooses an article and launches the detail page at 830 by clicking a detail screen button or otherwise selecting a detail screen for the chosen article. The application 802 opens the detail screen at 832 and requests detail data from the backend data service 803 at 834. Detail data for the article or asset is retrieved at 836 by backend data service 803 and returned to the application 802 at 838. The application 802 displays the data via control components of the dashboard at 840, and the expert user 801 views and modifies the attributes on detail page at 842. At 844, the application 802 sends the changed or updated attribute value to backend data service 803. The backend data service 803 updates attributes to the database at 846, and sends an operation status to the client application 802 at 848. The application 802 acknowledges to the user 801 that change is completed with or without error, for example, by displaying the system message to the user 801 at 850 and retrieving the attributes at 852. The user 801 can then see and acknowledge that the change is completed at 854. Method 800 then returns.

FIG. 9 shows a swim-lane flow chart illustrating an example method 900 for an expert user 901 accessing a keyword list comprising a semantic dictionary for a knowledge acceleration platform. Similar to FIG. 8, method 900 may be implemented with the system 300 depicted in FIG. 3, as an illustrative and non-limiting example, where an expert user 901 interfaces with the knowledge acceleration platform via a web browser 302 or third-party application 304, the application 902 comprises the application service 320, and the data service 903 comprises the data service 340. The expert user 901 provides login information at 905 to the application 902, which validates the login information at 910. If the login information is not valid ("NO"), the application 902 provides an invalid authentication error to the user 901 at 915. If the login information is valid ("YES"), the application 902 provides a user interface dashboard for the user 901 to interact with the knowledge acceleration platform. The expert user 901 clicks an administration menu at 920, chooses a product at 925, and a keyword type at 930 via the administration menu of the application 902. The application 902 then launches a keyword screen at 935 and requests keyword data from the server with the selected keyword type at 940. The data service 903 retrieves the keyword data from the database container at 945 and sends the semantic model data or keyword data back to the client application 902 at 950. At 955, the application 902 refreshes the keyword data in the displayed dashboard to include the received keyword data, such that the expert user 901 sees the refreshed keyword list at 960.

After accessing the keyword data, the expert user may perform various operations to edit or modify the keyword data. FIG. 10 shows a high-level swim-lane flow chart illustrating example methods 1000 for an expert user 1001 and a dashboard for modifying keyword data. Similar to FIGS. 8 and 9, method 1000 may be implemented with the system 300 depicted in FIG. 3, as an illustrative and non-limiting example, where an expert user 1001 interfaces with the knowledge acceleration platform via a web browser 302 or third-party application 304, the application 1002 comprises the application service 320, and the data service 1003 comprises the data service 340. To create a new keyword starting at 1005, the expert user 1001 clicks a new keyword button, as an illustrative example, to initiate the process. At 1015, the application 1002 adds a new empty keyword row into the keyword data table. The expert user 1001 then enters new keyword attributes at 1020 for the new empty keyword row. The application 1002 validates the keyword attributes at 1025 while the user 1001 enters the attributes, rejecting such attributes if they are not valid ("NO") which may occur if the attributes do not comply with predefined keyword attribute criteria, for example. If the keyword attributes are valid ("YES"), then the application 1002 enters the new keyword attribute(s) at 1030. At 1035, the data service 1003 updates the keyword attributes to the database, and at 1040 sends an operation status to the client application 1002. At 1045, the application 1002 retrieves the attributes from the data service 1003, displays a system message to the user 1001 at 1050 so that the user 1001 can acknowledge that the chance is completed at 1055.

Similarly, to edit a keyword at 1007, the expert user 1001 can choose an existing keyword type and then enter new keyword attributes at 1020. The application 1002 performs validation, and the data service 1003 updates the keyword attributes in the database.

To delete a keyword at 1060, the expert user 1001 selects a keyword at 1065 for deletion, and clicks a delete button at 1070, as an illustrative and non-limiting example. At 1075, the application 1002 sends a deletion keyword key for the keyword to the server or data service 1003. The data service 1003 updates a keyword deletion flag for the keyword at 1080 to perform a soft deletion of the keyword (e.g., so that the keyword can be recovered if necessary). At 1085, the data service 1003 sends an operation status (e.g., deletion complete) to the client application 1002, the application 1002 displays a system message including the operation status to the user 1001 at 1090, and the user 1001 acknowledges that the change is completed at 1095. Method 1000 then returns.

Figure 11:
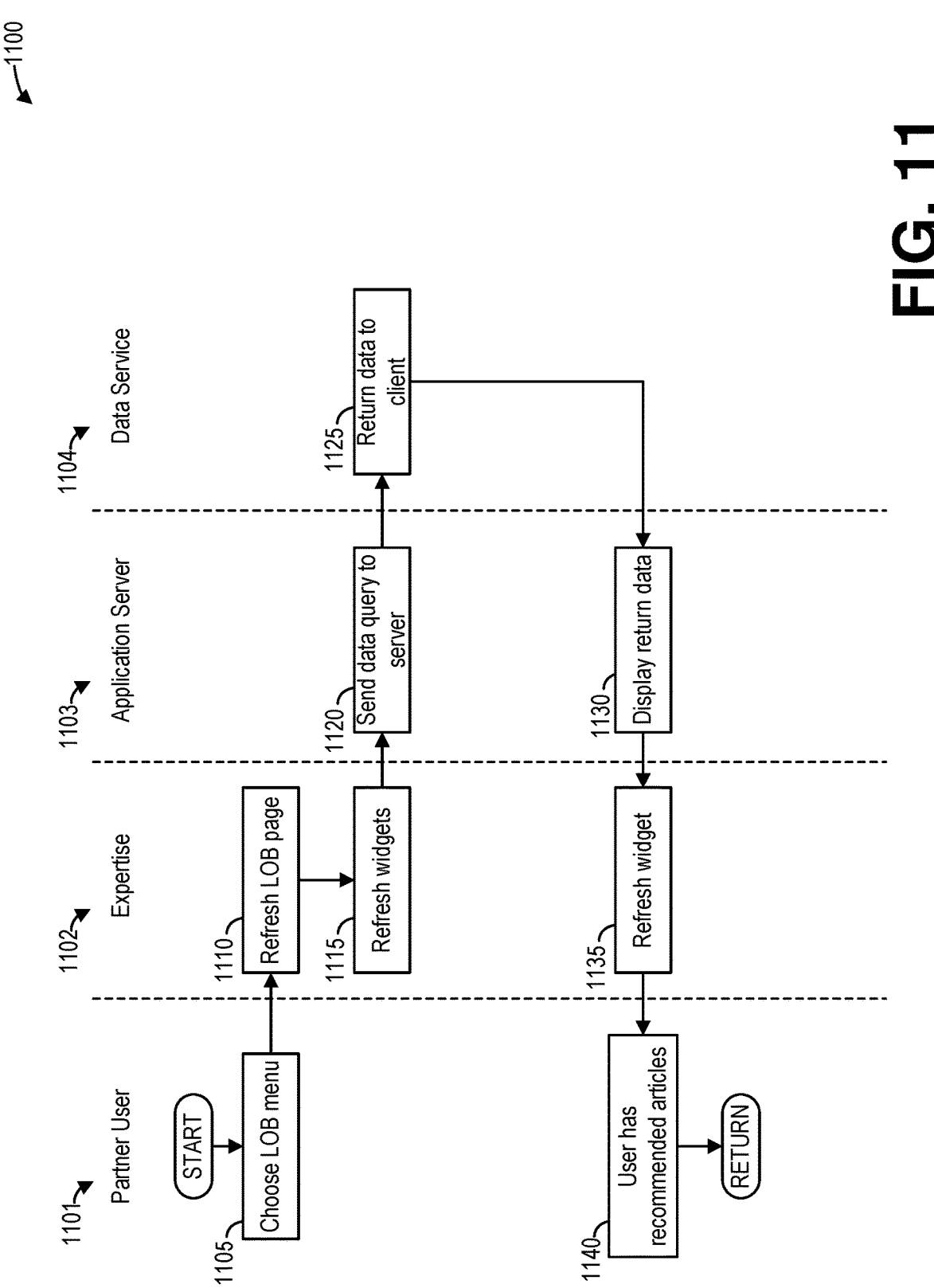
FIG. 11 is a high-level swim-lane flow chart illustrating an example method for providing assets with a knowledge accelerator platform, according to an embodiment.

FIG. 11 shows a swim-lane flow chart illustrating an example method 1100 for a partner user 1101 accessing recommended articles. The method 1100 may be executed by system 400 depicted in FIG. 4, for example, where a partner user 1101 interacts with the web browser 402, the expertise community portal 1102 corresponds to the expertise community portal 410, the application server 1103 corresponds to the application service 430, and the data service 1104 corresponds to the data service 440. The partner user 1101 logs into expertise community portal 1102, and the user 1101 chooses a Line of Business (LOB) menu at 1105. The expertise community portal 1102 refreshes the LOB page at 1110 and launches recommended article widgets (e.g., recommend blogs, events, knowledge base articles, and so on) at 1115. The application server 1103 sends a data query to the data service 1104 at 1120. The data query may include an identifier for the partner user 1101, for example, in addition to an identifier for a selected LOB or other filter parameters, for example. The data service 1104 retrieves JSON data to return to the application server 1103 based on the data query. The application server 1103 displays data at 1130 via the widget of the expertise community portal 1102, which refreshes the widget at 1135 so that the user 1101 can then see the recommended articles at 1140.

FIG. 12 is a high-level flow chart illustrating an example method 1200 for providing personalized recommendations with a knowledge acceleration platform, according to an embodiment. Specifically, method 1200 relates to using the knowledge index of a knowledge acceleration platform to recommend one or more assets to a given user. The method 1200 may be executed by system 400 depicted in FIG. 4, as an illustrative and non-limiting example, though it should be appreciated that the method 1200 may be implemented with other systems and components, such as the systems and components of FIGS. 1-3, without departing from the scope of the present disclosure.

Method 1200 begins at 1205. At 1205, method 1200 receives an access request from a user. The access request may comprise a request to access an expertise community portal, for example, and may comprise user login information identifying a specific user. At 1210, method 1200 evaluates the access request. Although not depicted, it should be appreciated that method 1200 may evaluate a validity of the access request, for example, by validating login information provided with the access request, and declining access if the login information is not valid.

At 1215, method 1200 determines whether the user is a new user. If the user is not a new user ("NO"), method 1200 proceeds to 1217, where method 1200 loads a user profile for the user. At 1240, method 1200 determines one or more recommended assets for the user based on the user profile. At 1245, method 1200 then provides a user interface comprising a dashboard populated with the recommendations. The user interface comprising the dashboard populated with the recommendations may be displayed via a display screen of a user device, for example, to the user. Method 1200 then returns.

Referring again to 1215, if method 1200 determines that the user is a new user ("YES"), method 1200 proceeds to 1220. At 1220, method 1200 outputs a user questionnaire to the user device of the user. The user questionnaire may comprise a plurality of questions with a plurality of responses for each question, for example. As an illustrative and non-limiting example, a first question of the user questionnaire may ask the user what product(s) or source(s) the user is working with or interested in using, and provide a plurality of response options for the user to select (e.g., a public cloud product, a private cloud product, a business technology platform, a business network, a specific network, and so on). A second question of the user questionnaire may ask the user about the role of the user, and provide a plurality of response options for the user to select (e.g., project manager, finance consultant, sourcing and procurement consultant, manufacturing consultant, integration and extensibility consultant, and so on). In some examples, the plurality of response options for the second question may be determined and output to the user based on the selection of a particular response option for the first question, such that the response options of the second option correspond to the respective selection for the first question. A third question of the user questionnaire may ask the user about the relative knowledge of the user with regard to a plurality of topics, where such topics may be determined and output to the user based on the selection of a particular response option to the second question. For example, if the user selects a response option indicating that the role of the user is a finance consultant role, the plurality of topics may relate to topics relating to finance. As an illustrative example, the plurality of topics may include financial planning, budget control, simple projects, universal allocation, product cost, market segment, accruals management, and so on. For the third question, the user questionnaire may provide a user input field (e.g., a slider) allowing the user to select a particular value (e.g., ranging from zero to ten) indicating the relative amount of knowledge of the user with regard to a given topic (e.g., where a lower value corresponds to a lower amount of knowledge and a higher value corresponds to a higher amount of knowledge). In this way, the user may indicate that they have minimal knowledge regarding, say, market segment and accruals management by selecting lower values for those respective topics, and indicate that they have advanced knowledge of, say, financial planning and budget control by selecting higher values for those respective topics. The user questionnaire may further include one or more questions asking the user about what topics they are interested in.

At 1225, method 1200 receives a response to the user questionnaire from the user. For the example user questionnaire described above, the response to the user questionnaire may comprise an indication of product(s) and/or source(s) to be used by the user, an indication of a role of the user, and an indication of user knowledge of one or more topics. At 1230, method 1200 may assign an expertise score to the user for each topic based on the received response. The expertise score may comprise the selected values for each topic provided by the user, for example, or may comprise a determination of a numerical score based on a combination of numerical values for different topics. As another example, the expertise score may comprise a relative expertise level (e.g., "beginner," "advanced," "expert") that maps numerical scores from the received response to a corresponding expertise level (e.g., numerical values of 0-4 may map to "beginner," 5-8 may map to "advanced," and 9-10 may map to "expert"). As another example, the relative expertise levels may comprise "beginner" and "advanced," where the numerical scores from 0 to a threshold x map to a "beginner" expertise level, while numerical scores from the threshold x to 10 map to an "advanced" expertise level, where the threshold x may be determined based on the specific topic in some examples.

At 1235, method 1200 initializes a user profile for the user based on the response and the assigned expertise score(s). The user profile may be stored in a container 133 as an example, and may be accessible by application services, authentication services, data services, and so on. As the user interacts with the knowledge acceleration platform, for example, by marking assets as favorites, such interactions may be saved to the user profile so that favorite assets may be easily retrieved and similar assets (e.g., with attributes similar to the favorite assets) may be recommended. Further, as the user gains additional experience (e.g., by interacting with certain assets), the user profile may update the assigned expertise level of the user. For example, if the user repeatedly interacts with assets associated with a given topic that are typically viewed by advanced users within that given topic, the user profile may be updated to assign an advanced expertise level to the user for that given topic.

At 1240, method 1200 determines one or more recommendations of one or more assets based on the user profile. For example, method 1200 may use the "product," "source," and "role" of the user stored in the user profile to filter assets in order to obtain a filtered set of assets. Method 1200 may then determine assets within the filtered set of assets that are recommended by expert users or administrators.

At 1245, method 1200 provides the user interface comprising a dashboard populated with the recommendation(s). The recommendation(s) comprise recommended assets, as described above, and may be displayed in a table where the assets are initially sorted by most recent (e.g., according to an update timestamp for each respective recommended asset). The table may include columns such as title and scope, and in some examples may include additional columns for fields such as industry, localization, business object, cross topic, author, component, event date, product, and so on. Such additional columns or fields may be configurable by the user for display in the dashboard, such that the user may selectively add or remove such fields from the display of the table. Further, the user may sort the recommendations according to a selected field. While displaying the recommended assets in order of most recently updated is one approach for determining the relevancy of a recommended asset, it should be appreciated that other approaches may be used. For example, the recommended assets may be initially sorted according to recommendation scores assigned to each respective asset, such that an asset that is recommended by more expert users is ranked higher (e.g., with a higher recommendation score) than another asset recommended by fewer expert users. An example user interface is described further herein with regard to FIG. 15. After providing the dashboard, method 1200 returns.

Example 4—Example Code Syntax

FIG. 13 illustrates example code syntax 1300 declaring rules for parsing assets of a given source, according to an embodiment. The code syntax 1300 provides different extraction rules 1305 for extracting metadata from an asset. For example, the extraction rules 1305 specify which fields in the asset should be extracted and saved into a column of a table for the asset. As an illustrative example, an identifier ("id") for the asset may be located in a field "GENERICAT-TRIBUTE40" while a URL ("url") may be located in a field "GENERICATTRIBUTE1," a title ("title") of the asset may be located in a field "GENERICATTRIBUTE2, and so on. The code syntax 1300 is provided in the Python programming language as an illustrative and non-limiting example.

As another illustrative and non-limiting example, FIG. 14 illustrates example code syntax 1400 declaring rules for extracting content from assets from a plurality of sources, according to an embodiment. Specifically, the code syntax 1400 provides different rules 1410, 1420, and 1430 for selectively extracting content from assets from different sources. For example, the rule 1410 specifies how to extract content from assets from a "COMMUNITY" data source, the rule 1420 specifies how to extract content from assets from a "KBA" data source, and the rule 1430 specifies how to extract content from assets from a "LEARNING HUB" data source. The rule 1410, for example, specifies a "rule"

where blog content to be extracted from a "COMMUNITY" asset may be found in a div wrapper with a class "ds-blog-post-detail" whereas the rule 1420 specifies that blog content to be extracted from a "KBA" asset may be found in a div wrapper with an id equal to "content."

Example 5—Example User Interfaces

Figure 15:
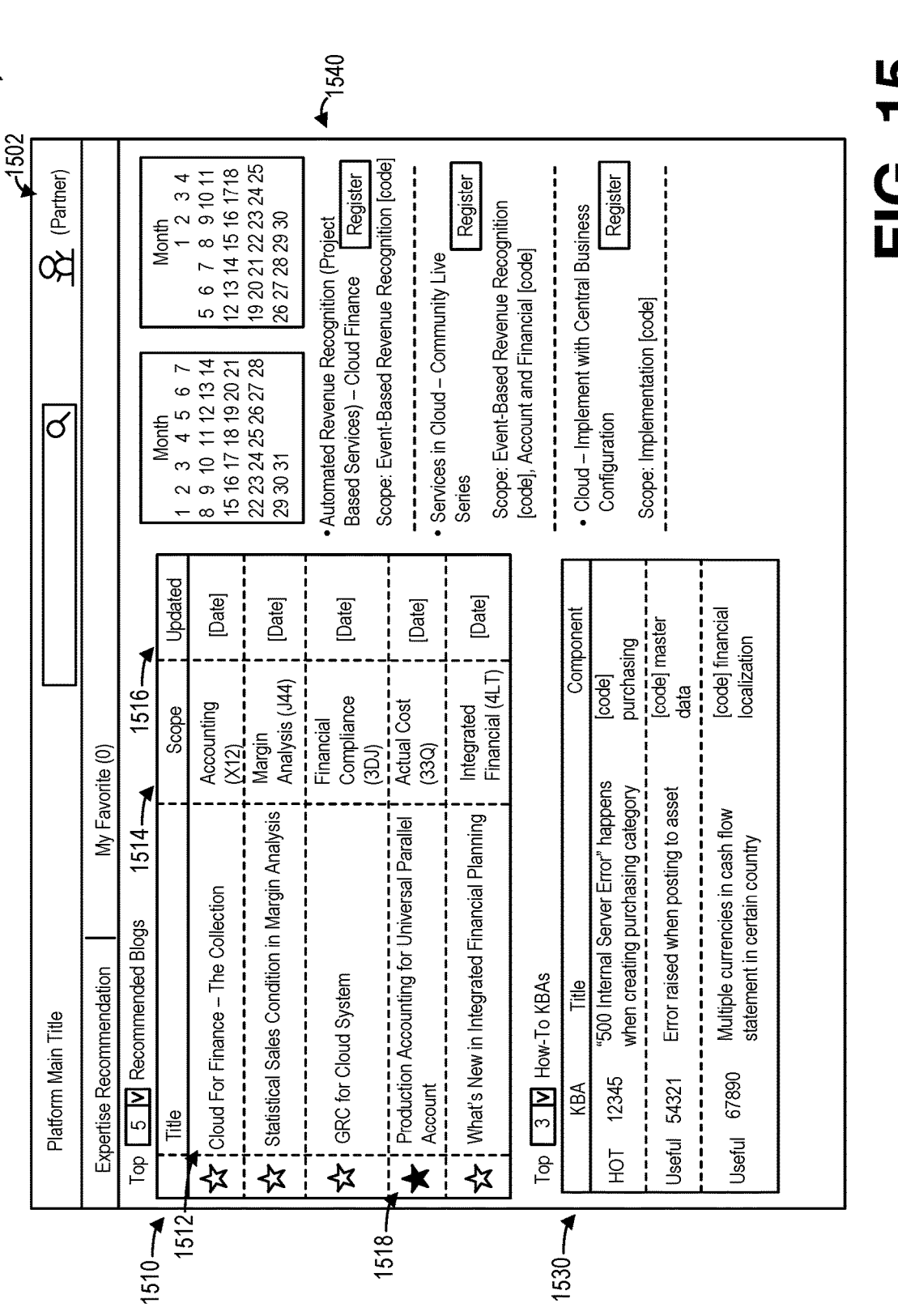
FIG. 15 illustrates an example user interface for leveraging a knowledge accelerator platform, according to an embodiment.

As described hereinabove, various user interfaces enable users and expert users to interface with the knowledge accelerator platform. As an illustrative and non-limiting example, FIG. 15 illustrates an example user interface 1500 for leveraging a knowledge accelerator platform, according to an embodiment. User interface 1500 may comprise a UI dashboard presenting recommended articles to users via a web browser, for example. Specifically, the recommendations 1510, 1530, and 1540 displayed via the user interface 1500 may be provided for a specific user 1502 logged into the knowledge acceleration platform, such that the recommendations are tailored to the interests, existing knowledge, and preferences of the user 1502. To that end, the user 1502 may be queried when setting up a profile to identify areas of expertise, areas of interest, amount of expertise in different areas, and so on. In this way, recommendations may be provided that are suitable and interesting to the user 1502.

The recommendations 1510 may comprise a specific type of asset (e.g., blog posts) to be presented to the user 1502, while the recommendations 1530 and 1540 may comprise different assets (e.g., knowledge base articles and events, respectively). The recommendations 1510 may be presented as a table, for example, with a title 1512 of the asset, a scope 1514 of the asset, and a timestamp 1516 for the asset, as illustrative and non-limiting examples. The user 1502 may further indicate that a specific asset is a favorite asset via the user interface 1500, for example, by clicking or otherwise interacting with a specific asset (e.g., by clicking a star 1518 next to a particular asset). Such selections by the user 1502 may be stored in the database of the knowledge acceleration platform so that the quality score of the selected asset may be updated, and furthermore associated with the specific user 1502 so that the user 1502 may easily retrieve the asset later, and so that the asset may be automatically recommended to users with preferences and interests similar to the user 1502.

Thus, the user interface 1500 leverages the knowledge index of the knowledge accelerator platform to provide personalized recommendations to users. The recommendations provided via the user interface 1500 are improved because they may be sourced from data sources that a user would not consider searching or reviewing, or within different fields that the user may not have considered despite the relevance of the asset to the user's interests.

Figure 16:
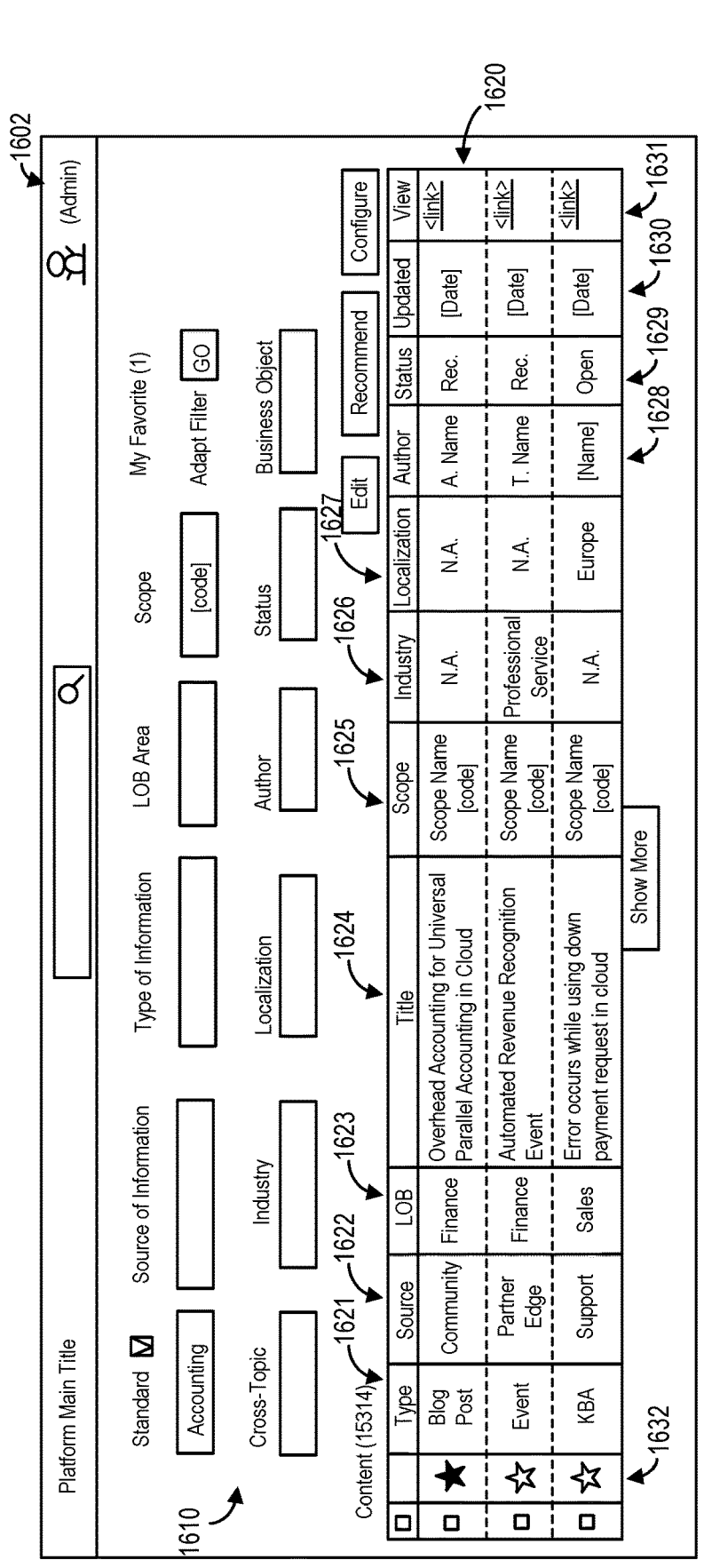
FIG. 16 illustrates an example user interface for interacting with a knowledge index of a knowledge accelerator platform, according to an embodiment.

FIG. 16 illustrates an example user interface 1600 for interacting with a knowledge index of a knowledge accelerator platform, according to an embodiment. The user interface 1600 provides an interface for searching through assets across data sources. In some examples, partner users or other non-expert users may use the user interface 1600 to filter assets according to different attribute filters 1610. As depicted, the user interface 1600 is configured for expert users or an administrator 1602 so that the administrator 1602 may interact with the assets (e.g., by editing or recommending) in ways that a normal user with different privileges may be enabled.

The user interface 1600 provides a table 1620 displaying results for any filters that are applied in the attribute filters 1610. The table 1620 comprises columns corresponding to columns in the knowledge index, for example, and each row of the table 1620 corresponds to a different asset. The table 1620 therefore includes columns for a type 1621 of asset, a source 1622 of the asset, a line of business (LOB) 1623 of the asset, a title 1624 of the asset, a scope 1625 of the asset, an industry 1626 for the asset, a localization 1627 of the asset, author(s) 1628 of the asset, a status 1629 of the asset (e.g., recommended or not), a timestamp 1630 for the asset (e.g., indicating a creation of the asset and/or a last update of the asset), and a link 1631 to the asset (e.g., a URL or another file locator). The table 1620 may further include an indication 1632 of whether the asset is a favorite of the user 1602. It should be appreciated that the table 1620 corresponds to only a subset of information regarding assets that may be saved in the knowledge index. For example, the knowledge index may store additional information for an asset such as key performance indicators, keyword labels, user-specific data (e.g., linking users who have favorited an asset to the asset, for example via a unique user identifier for each user), quality scores, expertise level (e.g., introductory level or expert level), and so on.

The user interface 1600 thus enables users to search through assets across a plurality of sources and to view metadata relating to each asset. Further, for expert users or administrators, the user interface 1600 enables such users to edit the information for a given asset and thus to update the knowledge index. For example, a user may recommend a given asset, thus changing a status of the asset from open to recommended. Such a user may similarly edit the LOB, title, scope, industry, localization, keyword labels, and so on.

Example 6—Example Knowledge Index and Semantic Dictionary

FIG. 17 provides example tables 1700, 1750 illustrating how data for a semantic dictionary and for a knowledge index can be maintained. In particular implementations, the tables 1700, 1750 can be implemented in a relational database system, or in multiple relational database systems, or in different schemas of a common relational database system. For instance, the table 1700 can be used during asset processing to assign labels to assets, but metadata for the labelled assets (including a link to the asset) can be stored in a relational database table of a different schema or a different relational database management system. The table 1700 can be used by submitting a keyword or phrase for which labels are desired, optionally using one or more other fields of the table 1700 (which will be further described) as filters. The table 1750 can be used by submitting a request for one or more labels from the table, where values of one or more other fields as the table, such as an asset identifier, asset type, or other field of the table (as will be further described) as filters.

As has been described, particular content can be identified for content extraction and analysis, which can include identifying one or more keywords or phrases associated with a particular content item (or "asset"). The keywords or phrases can be compared with entries in the table 1700 for the semantic dictionary, and information, such as labels, maintained in the semantic index can be determined and "tagged" to the particular asset, which information can be stored in the knowledge index as represented in the table 1750.

The table 1700 includes a keyword category column 1710a. The keyword category column 1710a can identify a particular category of labels that are available to be assigned to assets. For example, the keyword category column 1710a is shown as having possible values of "Scope Item," "LOB Assignment," "Cross Topic," "Localization," and "Business Object."

The keyword categories can include extracted label assignments, user-provided label assignments, or a combination thereof. For example, the "Scope Item" keyword category can be associated with classifications, including hierarchically arranged classifications, which can be provided as part of product documentation. A "best practices" document is one possible source of scope identifiers and/or labels and/or keywords, such as the best practices document available at rapid.sap.com/bp/#/browse/packageversions/BP_OP_ENTPR. Processes can be designed to automatically extract keywords that are to be associated with various scope items, as well as different labels that might be associated with a given scope item.

Columns 1710b and 1710c provide additional classification information that may be relevant for some or all of the keyword category values of the column 1710a. In particular, column 1710b provides a particular subject matter area to which a given set of labels (row of the table 1700) is relevant. As shown, the column 1710b is only relevant for scope items and LOB (line of business) assignments keyword categories. The column 1710c provides a scope identifier associated with a set of labels, but is only relevant for the scope item keyword category.

Columns 1710d-1710f provide various labels that are defined for a given row of the table 1700. A given row can have values for one or more of the columns 1710d-1710f. In addition, although the table 1700 is shown with three possible label levels, a greater or lesser number of label levels can be used if desired. Further, in some cases, a given keyword or set of keywords associated with a given row, indicated by a value of a column 1710g, can have entries in multiple rows. The presence of multiple rows for a single keyword/set can be useful, as it can, for example, provide for multiple labels at a common hierarchical level. That is, the columns 1710d-1170f can have label values that are organized from general to specific, for example. In some cases, results provided from the table 1700 can depend on a particular request. That is, for example, a request to tag a particular asset can be specified to use all labels for particular keywords or to only apply labels at a particular level, such as only tagging content with a most general label represented in the column 1710d.

The table 1700 is also shown as including a column 1710h that provides a unique identifier (such as a globally unique identifier) that allows a discrete row of the table 1700 to be identified. Having the identifier column 1710h can be useful, including because, as described above, multiple rows may exist for a particular keyword. In some cases, a value of the identifier column 1710h can be assigned to a content item/asset as part of the labelling process, such as will be further described with respect to the table 1750.

The table 1750 provides an example of how tagged assets can be stored. A column 1760a provides a unique identifier for a particular row of the table 1750, which can be useful if, for example, multiple rows are provided for a particular tagged asset. Depending on implementation, all labels can be included in a single row, or different rows can be provided, such as having different rows based on different keywords that gave rise to a particular set of labels, or if it is desired to have different rows for an asset (even for a common keyword) based on a different keyword category (such as represented in the column 1710a of the table 1700).

A column 1760b provides a particular content source associated with an asset. A content source can be, for example, a particular software application, computing system, or forum, such as a social media network or website that provides information about using particular software. In the example shown, "SAP COMMUNITY" can represent a website featuring contents such as user questions, blog posts, or newsletters. A specific asset type, such as a blog post, can be identified by a value in a content type column 1760*c*.

Columns 1760*d* and 1760*e* provide, respectively, a title of the asset and a link to where the asset can be accessed. The link can be to a "live" version of the asset, or it can be to an archived version of the asset, such as a copy of the asset used during extraction and processing of the asset. Optionally, links to both live and archived asset versions can be provided. Additional metadata about an asset can optionally be provided if desired, such as a publication date of the asset, a date the asset was last processed for labelling, an author of the asset, a user level of the asset (such as beginner or advanced), or a length of the asset or whether the asset includes graphical/video information.

As discussed above, a particular entry in the table 1750 can optionally be associated with a particular row of the table 1700. In this case, a value of the column 1710*h* can be provided as a value of a column 1760*f*. As mentioned, label information can be maintained in different ways. As shown, columns 1760*g*-17601 correspond to the columns 1710*b*-1710*f* of the table 1700. In other implementations, a given asset can have a single row in the table 1750, where the table 1750 has columns representing label information for multiple keyword categories.

Example 7—Additional Methods

FIG. 18 is a high-level flowchart illustrating an example method 1800 for a knowledge accelerator platform, according to an embodiment.

At 1810, a plurality of assets are retrieved from a plurality of data sources. A respective asset of the plurality of assets includes a plurality of textual elements. Metadata is extracted from respective assets of the plurality of assets at 1820 to provide extracted metadata. The extracted metadata for a given asset of the plurality of assets includes a first set of one or more keywords or phrases from the plurality of textual elements of the given asset of the plurality of assets.

At 1830, at least one label for given assets of the plurality of assets is determined based on a semantic dictionary. The semantic dictionary includes a plurality of entries. A given entry of the plurality of entries includes a second set of one or more keywords or phrases and one or more labels associated with the one or more keywords of the given entry. The determining at least one label includes comparing the first set of one or more keywords or phrases of a given asset of the plurality of assets with the second set of one or more keywords or phrases for multiple entries of the plurality of entries of the semantic index. At least a portion of the extracted metadata and the at least one label for given assets of the plurality of assets are stored in a knowledge index at 1840.

Example 8—Example Advantages

A number of advantages can be achieved via the technology described herein. For example, a knowledge index for a knowledge acceleration platform stores metadata for a plurality of assets stored in a plurality of different data sources, thereby providing a unified source for interfacing with the plurality of assets, for example, to perform analytics and to provide personalized recommendations. In this way, a user may search for assets or be automatically provided with relevant assets spread across a plurality of data sources without needing to search within each respective data source itself. The knowledge index uses a semantic model comprising a keyword repository to associate different assets using different keywords but having a similar semantic relationship. In this way, assets with a semantic association may be linked via the knowledge index and provided to users without the need for specifically identifying keywords or topics for a given asset. The knowledge acceleration platform provided herein thus enables consolidated analytics and interfacing with a large plurality of assets stored across a plurality of data sources, thereby reducing computational expense (e.g., computing requirements, computing time, processing resources) of interfacing with such assets. In addition to these improvements in database technology, additional advantages are provided for users by way of accelerated knowledge acquisition, where users can quickly and easily find and access assets dispersed across disparate data platforms that are semantically linked despite apparent irrelevance to each other (e.g., due to dissimilar keywords used in different domains). In this way, time for knowledge acquisition is decreased. Further, redundancy is avoided by providing desired assets that may otherwise appear to not exist (e.g., due to only searching through assets in a subset of data sources, or using a limited keyword search).

Example 8—Computing Environments

Figure 19:
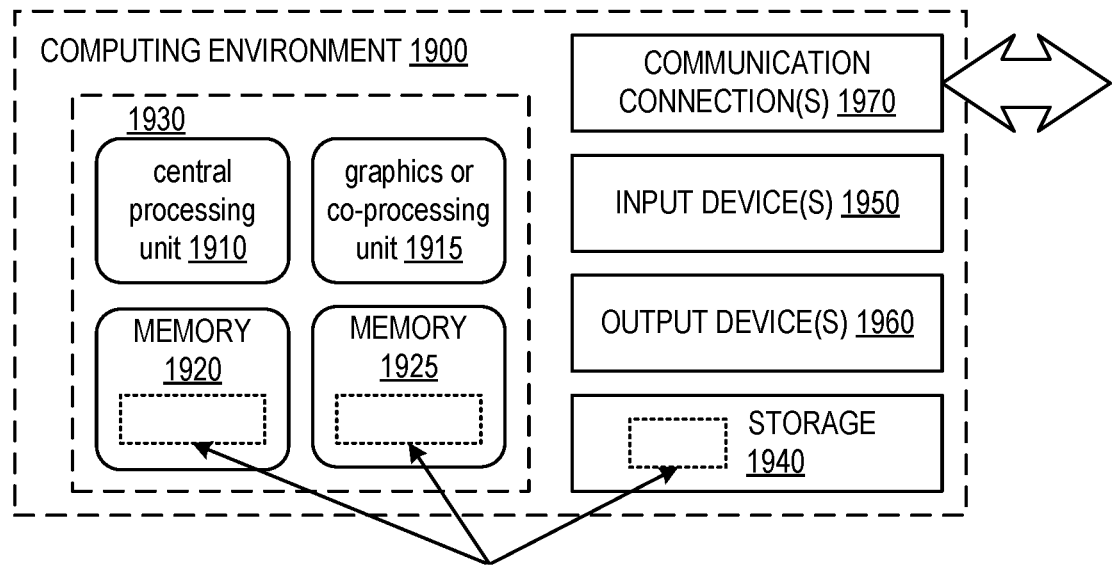
FIG. 19 is a block diagram illustrating an example computing system in which described embodiments can be implemented.

FIG. 19 depicts an example of a suitable computing system 1900 in which the described innovations can be implemented. The computing system 1900 is not intended to suggest any limitation as to scope of use or functionality of the present disclosure, as the innovations can be implemented in diverse computing systems.

With reference to FIG. 19, the computing system 1900 includes one or more processing units 1910, 1915 and memory 1920, 1925. In FIG. 19, this basic configuration 1930 is included within a dashed line. The processing units 1910, 1915 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 19 shows a central processing unit 1910 as well as a graphics processing unit or co-processing unit 1915. The tangible memory 1920, 1925 can be volatile memory (e.g., registers, cache, RAM), non-volatile memory (e.g., ROM, EEPROM, flash memory, etc.), or some combination of the two, accessible by the processing unit(s) 1910, 1915. The memory 1920, 1925 stores software 1980 implementing one or more innovations described herein, in the form of computer-executable instructions suitable for execution by the processing unit(s) 1910, 1915.

A computing system 1900 can have additional features. For example, the computing system 1900 includes storage 1940, one or more input devices 1950, one or more output devices 1960, and one or more communication connections 1970, including input devices, output devices, and communication connections for interacting with a user. An interconnection mechanism (not shown) such as a bus, controller, or network interconnects the components of the computing system 1900. Typically, operating system software (not shown) provides an operating environment for other software executing in the computing system 1900, and coordinates activities of the components of the computing system 1900.

The tangible storage 1940 can be removable or non-removable, and includes magnetic disks, magnetic tapes or cassettes, CD-ROMs, DVDs, or any other medium which can be used to store information in a non-transitory way, and which can be accessed within the computing system 1900. The storage 1940 stores instructions for the software 1980 implementing one or more innovations described herein.

The input device(s) 1950 can be an input device such as a keyboard, mouse, pen, or trackball, a voice input device, a scanning device, touch device (e.g., touchpad, display, or the like) or another device that provides input to the computing system 1900. The output device(s) 1960 can be a display, printer, speaker, CD-writer, or another device that provides output from the computing system 1900.

The communication connection(s) 1970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc., that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 9—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 10—Cloud Computing Environments

Figure 20:
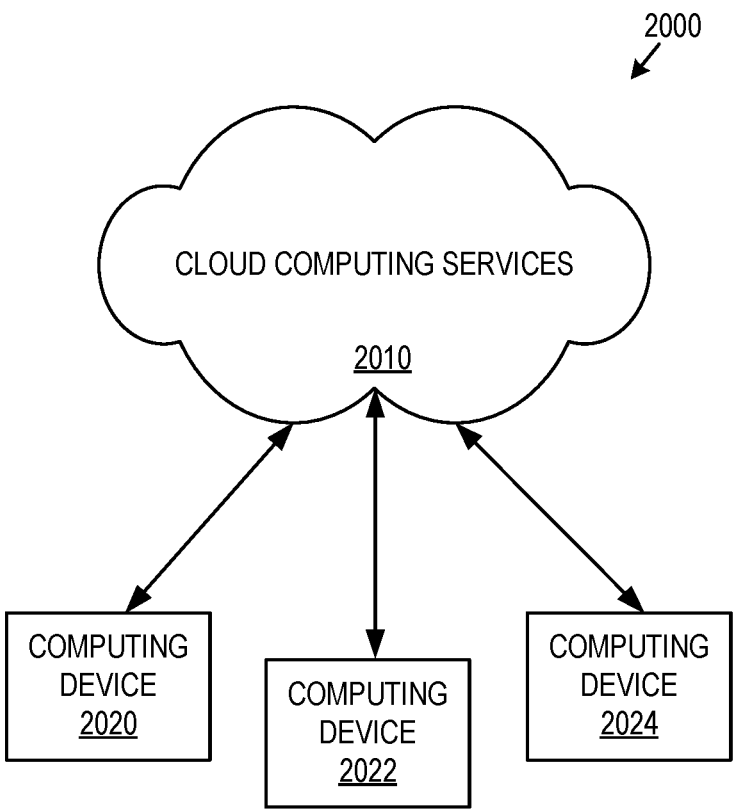
FIG. 20 is a block diagram of an example cloud computing environment that can be used in conjunction with the technologies described herein.

FIG. 20 depicts an example cloud computing environment 2000 in which the described technologies can be implemented, including, e.g., the system 100 of FIG. 1 and other systems herein. The cloud computing environment 2000 comprises cloud computing services 2010. The cloud computing services 2010 can comprise various types of cloud computing resources, such as computer servers, data storage repositories, networking resources, etc. The cloud computing services 2010 can be centrally located (e.g., provided by a data center of a business or organization) or distributed (e.g., provided by various computing resources located at different locations, such as different data centers and/or located in different cities or countries).

The cloud computing services 2010 are utilized by various types of computing devices (e.g., client computing devices), such as computing devices 2020, 2022, and 2024. For example, the computing devices (e.g., 2020, 2022, and 2024) can be computers (e.g., desktop or laptop computers), mobile devices (e.g., tablet computers or smart phones), or other types of computing devices. For example, the computing devices (e.g., 2020, 2022, and 2024) can utilize the cloud computing services 2010 to perform computing operations (e.g., data processing, data storage, and the like).

In practice, cloud-based, on-premises-based, or hybrid scenarios can be supported.

Example 11—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 12—Example Alternatives

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A method, implemented in a computing system comprising at least one memory and at least one hardware processor coupled to the at least one memory, the method comprising:

retrieving a plurality of assets from a plurality of data sources, the plurality of assets comprising at least a first asset type retrieved using a structured interface and a second asset type retrieved via a different access interface, a respective asset of the plurality of assets comprising a plurality of textual elements;

extracting metadata from respective assets of the plurality of assets to provide extracted metadata, the extracted metadata for a given asset of the plurality of assets comprising a first set of one or more keywords or phrases from the plurality of textual elements of the given asset of the plurality of assets, wherein the metadata is extracted using source-specific extraction logic associated with an access interface type and asset structure associate with the respective asset;

determining, for respective assets of the plurality of assets, at least one label based on a semantic dictionary, the semantic dictionary comprising a plurality of entries, a given entry of the plurality of entries comprising a second set of one or more keywords or phrases and one or more labels associated with the one or more keywords of the given entry, the determining at least one label comprising comparing the first set of one or more keywords or phrases of a given asset of the plurality of assets with the second set of one or more keywords or phrases for multiple entries of the plurality of entries of the semantic index, wherein the semantic dictionary maps different domain-specific terms from multiple data sources to a shared normalized label; and storing, for assets of the respective assets, at least a portion of the extracted metadata and the at least one label in a knowledge index as a structured representation, the structured representation comprising the extracted metadata and one or more semantic labels assigned based on keyword-to-label associations.

2. The method of claim 1, wherein the plurality of assets comprises a first plurality of assets and a second plurality of assets, wherein the plurality of data sources comprises a first data source and a second data source, and wherein retrieving the plurality of assets from the plurality of data sources comprises:

retrieving the first plurality of assets from the first data source according to a first retrieval procedure; and retrieving the second plurality of assets from the second data source according to a second retrieval procedure different from the first retrieval procedure.

3. The method of claim 2, wherein extracting the metadata from each asset of the plurality of assets comprises:

extracting first metadata from a first asset of the first plurality of assets according to a first extraction procedure; and extracting second metadata from a second asset of the second plurality of assets according to a second extraction procedure different from the first extraction procedure.

4. The method of claim 3, wherein the first extraction procedure is based on a document structure of the first asset, and the second extraction procedure is based on a document structure of the second asset.

5. The method of claim 2, wherein the first retrieval procedure is based on an access interface of the first data source, and the second retrieval procedure is based on an access interface of the second data source.

6. The method of claim 1, wherein the determining at least one label for given assets of the plurality of assets comprises determining a label of the semantic dictionary that is lined to two or more keywords or phrases of the semantic dictionary.

7. The method of claim 1, further comprising automatically generating a quality score for respective assets of the plurality of assets, and storing the quality score in the knowledge index.

8. The method of claim 1, further comprising receiving a recommendation indication from a user for a given asset of the plurality of assets, and storing the recommendation indication for the given asset of the plurality of assets in the knowledge index.

9. The method of claim 1, further comprising:

receiving, via a user interface, a selection of at least one attribute;

determining, from the knowledge index according to the selection of the at least one attribute, at least one asset of the plurality of assets; and displaying, via the user interface, the at least one asset of the plurality of assets.

10. The method of claim 9, wherein the selection of at least one attribute comprises a keyword linked to a respective label in the semantic dictionary, the method further comprising determining the at least one asset of the plurality of assets based on the semantic dictionary.

11. The method of claim 1, further comprising:

retrieving multiple assets of the plurality of assets from the plurality of sources in parallel, wherein a first worker instance of a plurality of worker instances retrieves a first plurality of assets of the plurality of assets from a first data source of the plurality of data sources while a second worker instance of the plurality of worker instances retrieves a second plurality of assets of the plurality of assets from a second data source of the plurality of data sources.

12. A computing system, comprising:

at least one memory;

one or more hardware processors coupled to the at least one memory;

one or more computer-readable storage media storing instructions that, when executed by the computing system, cause the computing system to:

retrieve a plurality of assets from a plurality of remote data sources, the plurality of assets comprising at least a first asset type retrieved using a structured interface and a second asset type retrieved via a different access interface, a respective asset of the plurality of assets comprising a plurality of textual elements;

extract metadata from respective assets of the plurality of assets to provide extracted metadata, the extracted metadata for a given asset of the plurality of assets comprising a first set of one or more keywords or phrases from the plurality of textual elements of the given asset of the plurality of assets, wherein the metadata is extracted using source-specific extraction logic associated with an access interface type and asset structure associate with the respective asset;

determine, for respective assets of the plurality of assets, at least one label based on a semantic dictionary, the semantic dictionary comprising a plurality of entries, a given entry of the plurality of entries comprising a second set of one or more keywords or phrases and one or more labels associated with the one or more keywords of the given entry, the determining at least one label comprising comparing the first set of one or more keywords or phrases of a given asset of the plurality of assets with the second set of one or more keywords or phrases for multiple

23 entries of the plurality of entries of the semantic index, wherein the semantic dictionary maps different domain-specific terms from multiple data sources to a shared normalized label; and store, for assets of the respective assets, at least a portion of the extracted metadata and the at least one label in the knowledge index without storing the plurality of assets in the knowledge index.

13. The computing system of claim 12, wherein the plurality of assets comprises a first plurality of assets and a second plurality of assets, wherein the plurality of data sources comprises a first data source and a second data source, and wherein to retrieve the plurality of assets from the plurality of data sources, the one or more computer-readable storage media further stores instructions that, when executed by the computing system, cause the computing system to:

retrieve the first plurality of assets from the first data source according to a first retrieval procedure; and retrieve the second plurality of assets from the second data source according to a second retrieval procedure different from the first retrieval procedure.

14. The computing system of claim 13, wherein to extract the metadata from each asset of the plurality of assets, the one or more computer-readable storage media further stores instructions that, when executed by the computing system, cause the computing system to:

extract first metadata from a first asset of the first plurality of assets according to a first extraction procedure; and extract second metadata from a second asset of the second plurality of assets according to a second extraction procedure different from the first extraction procedure.

15. The computing system of claim 14, wherein the first extraction procedure is based on a document structure of the first asset, and the second extraction procedure is based on a document structure of the second asset.

16. The computing system of claim 13, wherein the first retrieval procedure is based on an access interface of the first data source, and the second retrieval procedure is based on an access interface of the second data source.

17. The computing system of claim 12, wherein the determining at least one label for given assets of the plurality of assets comprises determining a label of the semantic dictionary that is lined to two or more keywords or phrases of the semantic dictionary.

18. The computing system of claim 12, wherein the one or more computer-readable storage media further stores instructions that, when executed by the computing system, cause the computing system to:

retrieve multiple assets of the plurality of assets from the plurality of sources in parallel, wherein a first worker instance of a plurality of worker instances retrieves a first plurality of assets of the plurality of assets from a first data source of the plurality of data sources while a second worker instance of the plurality of worker instances retrieves a second plurality of assets of the plurality of assets from a second data source of the plurality of data sources.

19. The computing system of claim 12, wherein the one or more computer-readable storage media further stores

24 instructions that, when executed by the computing system, cause the computing system to:

provide a user interface displayable by a web browser or application of a remote user system;

receive, via the user interface, a selection of at least one attribute;

determine, from the knowledge index according to the selection of the at least one attribute, at least one asset of the plurality of assets; and transmit, to the remote user system, metadata stored in the knowledge index for the at least one asset of the plurality of assets for display via the user interface.

20. One or more non-transitory computer-readable media comprising:

computer-executable instructions that, when executed by a computing system comprising at least one hardware processor and at least one memory coupled to the at least one hardware processor, cause the computing system to retrieve a plurality of assets from a plurality of data sources, the plurality of assets comprising at least a first asset type retrieved using a structured interface and a second asset type retrieved via a different access interface, a respective asset of the plurality of assets comprising a plurality of textual elements;

computer-readable instructions that, when executed by the computing system, cause the computing system to extract metadata from respective assets of the plurality of assets to provide extracted metadata, the extracted metadata for a given asset of the plurality of assets comprising a first set of one or more keywords or phrases from the plurality of textual elements of the given asset of the plurality of assets, wherein the metadata is extracted using source-specific extraction logic associated with the respective asset;

computer-readable instructions that, when executed by the computing system, cause the computing system to determine, for respective assets of the plurality of assets, at least one label based on a semantic dictionary, the semantic dictionary comprising a plurality of entries, a given entry of the plurality of entries comprising a second set of one or more keywords or phrases and one or more labels associated with the one or more keywords of the given entry, the determining at least one label comprising comparing the first set of one or more keywords or phrases of a given asset of the plurality of assets with the second set of one or more keywords or phrases for multiple entries of the plurality of entries of the semantic index, wherein the semantic dictionary maps different domain-specific terms from multiple data sources to a shared normalized label; and computer-readable instructions that, when executed by the computing system, cause the computing system to store, for respective assets of the plurality of assets, at least a portion of the extracted metadata and the at least one label in a knowledge index as a structured representation, the structured representation comprises the extracted metadata and one or more semantic labels assigned based on keyword-to-label associations.

* * * * *